(12) United States Patent
Shi et al.

(10) Patent No.: US 10,951,372 B2
(45) Date of Patent: Mar. 16, 2021

(54) DMRS PORT CONFIGURATION INFORMATION OBTAINING METHOD, DMRS PORT CONFIGURATION INFORMATION DELIVERY METHOD, AND APPARATUS

(71) Applicant: Huawei Technologies Co., Ltd., Guangdong (CN)

(72) Inventors: Hongzhe Shi, Shanghai (CN); Yong Liu, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,657

(22) Filed: Mar. 29, 2019

(65) Prior Publication Data

US 2019/0229871 A1 Jul. 25, 2019

Related U.S. Application Data

(63) Continuation of application No. PCT/CN2017/103255, filed on Sep. 25, 2017.

(30) Foreign Application Priority Data

Sep. 30, 2016 (CN) .......................... 201610875327.2

(51) Int. Cl.
*H04L 12/28* (2006.01)
*H04L 5/00* (2006.01)
(Continued)

(52) U.S. Cl.
CPC .............. *H04L 5/0048* (2013.01); *H04L 5/00* (2013.01); *H04L 5/0051* (2013.01);
(Continued)

(58) Field of Classification Search
CPC ....................................................... H04L 12/28
(Continued)

(56) References Cited

U.S. PATENT DOCUMENTS

2013/0022087 A1 1/2013 Chen et al.
2015/0092722 A1 4/2015 Zhang et al.
(Continued)

FOREIGN PATENT DOCUMENTS

CA 2943831 A1 1/2016
CA 2787834 C 6/2017
(Continued)

OTHER PUBLICATIONS

Translation of CN 102076076, pp. 1-21, May 25, 2011.*
(Continued)

*Primary Examiner* — Dang T Ton
(74) *Attorney, Agent, or Firm* — Kilpatrick Townsend & Stockton LLP

(57) ABSTRACT

The present disclosure discloses a demodulation reference signal (DMRS) port configuration information obtaining method, a DMRS port configuration information delivery method, and an apparatus, and relates to the field of communications technologies, to reduce signaling overheads. The DMRS port configuration information obtaining method may include: receiving, by user equipment (UE), indication information sent by a base station, where the indication information includes overview information of DMRS ports of all UEs scheduled by the base station; and obtaining, by the UE, DMRS port configuration information of all the UEs according to a preset rule and the indication information.

12 Claims, 13 Drawing Sheets

(51) Int. Cl.
*H04W 72/04* (2009.01)
*H04W 72/12* (2009.01)
*H04W 88/02* (2009.01)
*H04W 88/08* (2009.01)

(52) U.S. Cl.
CPC ....... *H04W 72/0466* (2013.01); *H04W 72/12* (2013.01); *H04L 5/0023* (2013.01); *H04W 88/02* (2013.01); *H04W 88/08* (2013.01)

(58) Field of Classification Search
USPC .......................................................... 370/329
See application file for complete search history.

(56) References Cited

U.S. PATENT DOCUMENTS

| | | |
|---|---|---|
| 2015/0156753 A1 | 6/2015 | Cheng et al. |
| 2016/0087774 A1 | 3/2016 | Guo et al. |
| 2016/0119936 A1 | 4/2016 | Kim et al. |
| 2016/0255519 A1 | 9/2016 | Cheng et al. |
| 2017/0238312 A1* | 8/2017 | Chen ................. H04W 72/0446 370/329 |
| 2020/0022122 A1* | 1/2020 | Wu ...................... H04L 5/0044 |

FOREIGN PATENT DOCUMENTS

| | | |
|---|---|---|
| CN | 102076076 A | 5/2011 |
| CN | 102082595 A | 6/2011 |
| CN | 102754364 A | 10/2012 |
| CN | 105531949 A | 4/2016 |
| CN | 105634707 A | 6/2016 |
| WO | 2011099663 A1 | 8/2011 |

OTHER PUBLICATIONS

3GPP TSG-RAN WG1 #60, R1-100991, Pantech:"DMRS Indicator of DL signalling for Non-transparent MU-MIMO", San Francisco, USA, Feb. 22-26, 2010, total 4 pages.
Pantech: "DMRS Indicator of DL signalling for Non-transparent MU-MIMO", 3GPP Draft; R1-102403, vol. RAN WG 1, No. Beijing, china; Apr. 12, 2010, Apr. 6, 2010, XP050419619, 4 pages.
ZTE: "Consideration on Downlink Signalling for MU-MIMO", 3GPP Draft; R1-095006, No. Jeju, Nov. 9, 2009, XP050389356, 6 pages.

* cited by examiner (a) The target UE is UE1

Information used to determine DMRS port configuration information of target UE:
- 0 0 — Minimum port number #0
- 1 0 — Quantity of transport layers, 3
- 0 — Scrambling identifier 0

Common information:
- 1 0 1 — Total quantity of transport layers, 6
- 1 1 — Total quantity of occupied ports, 4

(b) The target UE is UE2

Information used to determine DMRS port configuration information of target UE:
- 1 0 — Minimum port number #3
- 0 0 — Quantity of transport layers, 1
- 0 — Scrambling identifier 0

Common information:
- 1 0 1 — Total quantity of transport layers, 6
- 1 1 — Total quantity of occupied ports, 4

(c) The target UE is UE3

Information used to determine DMRS port configuration information of target UE:
- 0 0 — Minimum port number #0
- 0 1 — Quantity of transport layers, 2
- 1 — Scrambling identifier 0

Common information:
- 1 0 1 — Total quantity of transport layers, 6
- 1 1 — Total quantity of occupied ports, 4

DMRS PORT CONFIGURATION INFORMATION OBTAINING METHOD, DMRS PORT CONFIGURATION INFORMATION DELIVERY METHOD, AND APPARATUS

CROSS-REFERENCE TO RELATED APPLICATIONS

This application is a continuation of International Patent Application No. PCT/CN2017/103255 filed on Sep. 25, 2017, which claims priority to Chinese Patent Application No. 201610875327.2 filed on Sep. 30, 2016. The disclosures of the aforementioned applications are hereby incorporated by reference in their entireties.

TECHNICAL FIELD

The present application relates to the field of communications technologies, and in particular, to a demodulation reference signal (DMRS) port configuration information obtaining method, a demodulation reference signal port configuration information delivery method, and an apparatus.

BACKGROUND

A DMRS is used to demodulate a spatially multiplexed data stream. Currently, DMRS port configuration information is usually obtained in the following manner: A base station sends downlink control information (DCI) to user equipment (UE). The DCI includes DMRS port configuration information of the UE, and specifically includes a DMRS port number and a scrambling code corresponding to the DMRS port number that are allocated by the base station to the UE. In addition, the base station indicates, to the UE, the DMRS port configuration information of only the UE rather than DMRS port configuration information of other UEs.

In a multi-user multiple-input multiple-output (MU-MIMO) scenario, the base station can schedule a plurality of UEs each time. In a scheduling process, a data stream sent by the base station to scheduled UE is interfered by a data stream sent by the base station to another scheduled UE. An interference value of the interference may be obtained through an operation based on DMRS port configuration information of the UE and DMRS port configuration information of the other UE. If the DMRS port configuration information is obtained by using the method provided above, the UE cannot learn of the DMRS port configuration information of the another UE, and therefore cannot obtain the interference value.

To resolve the foregoing technical problem, an optional DMRS port configuration information obtaining method is as follows: The base station indicates the DMRS port configuration information of the other UE to the UE by indicating the DMRS port configuration information of the UE to the UE. For example, assuming that the base station schedules two UEs, namely, UE 1 and UE 2, this time, the base station sends DCI to the UE 1. The DCI includes DMRS port configuration information of the UE 1 and DMRS port configuration information of the UE 2. However, this method has the following problem: an amount of information included in the DCI increases as a quantity of UEs scheduled by the base station at a time increases, causing a problem of relatively large signaling overheads.

SUMMARY

Embodiments of the present disclosure provide a DMRS port configuration information obtaining method, a DMRS port configuration information delivery method, and an apparatus, to reduce signaling overheads.

To achieve the foregoing objective, the following technical solutions are used in the embodiments of the present disclosure:

According to a first aspect, a DMRS port configuration information obtaining method is provided. The method may include: receiving, by UE, indication information that is sent by a base station and that carries overview information of DMRS ports of all UEs scheduled by the base station; and then obtaining DMRS port configuration information of all the UEs according to a preset rule and the indication information. In an orthogonal scenario, the DMRS port configuration information may include a DMRS port number. In a semi-orthogonal scenario, the DMRS port configuration information may include a DMRS port number and a scrambling code corresponding to each DMRS port number. In the technical solution provided in this embodiment of the present disclosure, the base station sends, to the UE, the overview information of the DMRS ports of all the UEs scheduled by the base station. Therefore, compared with the prior art, to be specific, that the base station indicates, to the UE, detailed information of the DMRS ports of all the UEs scheduled by the base station, the information indicated by the base station to the UE in the technical solution provided in this embodiment of the present disclosure includes less content. Therefore, signaling overheads can be reduced.

According to a second aspect, UE is provided. The UE may include a receiving module and an obtaining module. The receiving module is configured to receive indication information sent by a base station. The indication information includes overview information of DMRS ports of all UEs scheduled by the base station. The obtaining module is configured to obtain DMRS port configuration information of all the UEs according to a preset rule and the indication information. For beneficial effects that can be achieved in the technical solution, refer to the first aspect, and details are not described herein again.

According to a third aspect, a DMRS port configuration information delivery method is provided. The method may include: sending, by a base station, indication information to UE, to instruct the UE to obtain, according to a preset rule and the indication information, DMRS port configuration information of all UEs scheduled by the base station. The indication information includes overview information of DMRS ports of all the UEs. For example, the base station sends the indication information to the UE by using DCI. Certainly, the base station may alternatively send the indication information to the UE by using other information. For beneficial effects that can be achieved in the technical solution, refer to the first aspect, and details are not described herein again.

According to a fourth aspect, a base station is provided. The base station may include a sending module, configured to send indication information to UE, to instruct the UE to obtain, according to a preset rule and the indication information, DMRS port configuration information of all UEs scheduled by the base station. The indication information includes overview information of DMRS ports of all the UEs. For beneficial effects that can be achieved in the technical solution, refer to the first aspect, and details are not described herein again.

Based on the third aspect, in a possible design, before the sending, by a base station, indication information to UE, the method may further include: configuring, by the base station, the DMRS ports for all the UEs according to the preset rule, and generating the overview information based on the DMRS ports configured for all the UEs. Correspondingly, in the fourth aspect, the base station may further include a configuration module and a generation module. The configuration module is configured to configure the DMRS ports for all the UEs according to the preset rule. The generation module is configured to generate the overview information based on the DMRS ports configured for all the UEs.

Based on any one of the foregoing aspects, in a possible design, the overview information may include at least one of the following information: a total quantity of transport layers of all the UEs, a total quantity of DMRS ports occupied by all the UEs, and a total quantity of DMRS ports not occupied by all the UEs. For example, in the orthogonal scenario, the overview information may include the total quantity of transport layers of all the UEs, the total quantity of DMRS ports occupied by all the UEs, or the total quantity of DMRS ports not occupied by all the UEs. In the semi-orthogonal scenario, the overview information may include the total quantity of transport layers of all the UEs and the total quantity of DMRS ports occupied by all the UEs; or may include the total quantity of transport layers of all the UEs and the total quantity of DMRS ports not occupied by all the UEs Based on any one of the foregoing aspects, in a possible design, the preset rule may include a DMRS port allocation rule. For example, the DMRS port allocation rule includes, but not limited to, any one of the following information: a rule of continuously allocating DMRS port numbers in ascending order, a rule of continuously allocating DMRS port numbers in descending order, a rule of allocating DMRS port numbers in ascending order of first odd and then even numbers or first even and then odd numbers, and a rule of allocating DMRS port numbers in descending order of first odd and then even numbers or first even and then odd numbers.

In this optional implementation, the configuring, by the base station, the DMRS ports for all the UEs according to the preset rule may include: allocating, by the base station, DMRS port numbers to all the UEs according to the DMRS port allocation rule. Correspondingly, the configuration module may be specifically configured to allocate DMRS port numbers to all the UEs according to the DMRS port allocation rule.

Based on any one of the foregoing aspects, in a possible design, the preset rule may include a DMRS port allocation rule and a scrambling code allocation rule. For example, the scrambling code allocation rule may include, but not limited to, any one of the following information: a rule of continuously allocating scrambling codes in ascending order, a rule of continuously allocating scrambling codes in descending order, a rule of allocating scrambling codes in ascending order of first odd and then even numbers or first even and then odd numbers, and a rule of allocating scrambling codes in descending order of first odd and then even numbers or first even and then odd numbers.

In this optional implementation, the configuring, by the base station, the DMRS ports for all the UEs according to the preset rule may include: allocating, by the base station, DMRS port numbers to all the UEs according to the DMRS port allocation rule, and allocating, to all the UEs according to the scrambling code allocation rule, scrambling codes corresponding to the DMRS port numbers. Correspondingly, the configuration module may be specifically configured to allocate DMRS port numbers to all the UEs according to the DMRS port allocation rule, and allocate, to all the UEs according to the scrambling code allocation rule, scrambling codes corresponding to the DMRS port numbers.

In this optional implementation, further optionally, the preset rule may further include: a rule that a quantity of DMRS ports corresponding to a previously allocated scrambling code is greater than or equal to a quantity of DMRS ports corresponding to a subsequently allocated scrambling code, or a rule that a quantity of DMRS ports corresponding to a subsequently allocated scrambling code is greater than or equal to a quantity of DMRS ports corresponding to a previously allocated scrambling code.

Based on this further optional implementation, the obtaining, by the UE, DMRS port configuration information of all the UEs according to a preset rule and the indication information may include: obtaining, by the UE, scrambling codes according to the scrambling code allocation rule, and obtaining the DMRS port configuration information of all the UEs based on the DMRS port allocation rule and the overview information when a same scrambling code is used; or obtaining, by the UE, DMRS port numbers of all the UEs based on the DMRS port allocation rule and the overview information, and when DMRS port numbers of different UEs are multiplexed, allocating a scrambling code to each multiplexed DMRS port number according to the scrambling code allocation rule. Correspondingly, the obtaining module may be specifically configured to obtain scrambling codes according to the scrambling code allocation rule, and obtain the DMRS port configuration information of all the UEs based on the DMRS port allocation rule and the overview information when a same scrambling code is used. Alternatively, the obtaining module may be specifically configured to obtain DMRS port numbers of all the UEs based on the DMRS port allocation rule and the overview information, and when DMRS port numbers of different UEs are multiplexed, allocate a scrambling code to each multiplexed DMRS port number according to the scrambling code allocation rule.

Based on this further optional implementation, the allocating, by the base station, DMRS port numbers to all the UEs according to the DMRS port allocation rule, and allocating, by the base station to all the UEs according to the scrambling code allocation rule, scrambling codes corresponding to the DMRS port numbers may include: allocating, by the base station, the scrambling codes according to the scrambling code allocation rule, and allocating the DMRS port numbers to all the UEs based on the DMRS port allocation rule and a quantity of transport layers of each of all the UEs when a same scrambling code is used; or allocating, by the base station, a DMRS port number to each UE based on the DMRS port allocation rule and a quantity of transport layers of each of all the UEs, and when DMRS port numbers of different UEs are multiplexed, allocating a scrambling code to each multiplexed DMRS port number according to the scrambling code allocation rule. Correspondingly, the configuration module may be specifically configured to: allocate the scrambling codes according to the scrambling code allocation rule, and allocate the DMRS port numbers to all the UEs based on the DMRS port allocation rule and a quantity of transport layers of each of all the UEs when a same scrambling code is used; or allocate a DMRS port number to each UE based on the DMRS port allocation rule and a quantity of transport layers of each of all the UEs, and when DMRS port numbers of different UEs are multiplexed, allocate a scrambling code to each multiplexed DMRS port number according to the scrambling code allocation rule.

Based on the preset rule provided in any one of the foregoing possible implementations, optionally, in a scenario satisfying that a maximum quantity of transport layers of each UE is 2 and a total quantity of preset DMRS ports is an even number greater than 0, because all the preset DMRS ports can be occupied by all the UEs, the overview information may include the total quantity of transport layers of all the UEs.

Optionally, before the allocating, by the base station, the scrambling codes according to the scrambling code allocation rule, and allocating the DMRS port numbers to all the UEs based on the DMRS port allocation rule and a quantity of transport layers of each of all the UEs when a same scrambling code is used, the method may further include: sorting, by the base station, all the UEs, to obtain at least two sequences; and selecting a first sequence from the at least two sequences according to an orthogonal priority rule. In this case, the allocating, by the base station, the scrambling codes according to the scrambling code allocation rule, and allocating the DMRS port numbers to all the UEs based on the DMRS port allocation rule and a quantity of transport layers of each of all the UEs when a same scrambling code is used may include: allocating, by the base station, the scrambling codes according to the scrambling code allocation rule, and sequentially allocating a DMRS port number to each of UEs in the first sequence based on the DMRS port allocation rule and the quantity of transport layers of each of all the UEs when the same scrambling code is used. Correspondingly, the base station provided in the fourth aspect may further include a sorting module and a selection module. The sorting module is configured to sort all the UEs, to obtain at least two sequences. The selection module is configured to select a first sequence from the at least two sequences according to an orthogonal priority rule. In this case, the configuration module may be specifically configured to allocate the scrambling codes according to the scrambling code allocation rule, and allocate a DMRS port number to each UE in the first sequence based on the DMRS port allocation rule and the quantity of transport layers of each of all the UEs when the same scrambling code is used. The orthogonal priority rule is a rule that a quantity of DMRS ports corresponding to a previously allocated scrambling code accounts for a maximum proportion of the total quantity of DMRS ports allocated to all the UEs or a rule that a quantity of DMRS ports corresponding to a subsequently allocated scrambling code accounts for a maximum proportion of the total quantity of DMRS ports allocated to all the UEs. In this optional implementation, data streams for communication between all the UEs scheduled this time and the base station can be maximally orthogonal, to reduce interference of data streams between different UEs, thereby improving system performance.

In the technical solution provided in any one of the foregoing aspects, optionally, the indication information may further include information used to determine DMRS port configuration information of the UE. The information used to determine the DMRS port configuration information of the UE may further include: a maximum DMRS port number allocated to the UE and a quantity of transport layers of the UE, or a minimum DMRS port number allocated to the UE and a quantity of transport layers of the UE. Further, the information used to determine the DMRS port configuration information of the UE may further include a scrambling code identifier allocated to the UE.

Based on this optional implementation, the method provided in the first aspect may further include: determining, by the UE, the DMRS port configuration information of the UE based on the information used to determine the DMRS port configuration information of the UE and the preset rule. Correspondingly, the UE provided in the second aspect may further include a determining module, configured to determine the DMRS port configuration information of the UE based on the information used to determine the DMRS port configuration information of the UE and the preset rule.

Based on any one of the foregoing aspects, optionally, the DMRS ports of all the UEs are classified into at least two DMRS port groups, and quasi co-locations QCLs of DMRS ports in different DMRS port groups are different. The overview information includes overview information of each DMRS port group. Overview information of a DMRS port group includes at least one of the following information: a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group. For a specific example, refer to the following descriptions.

Based on any one of the foregoing aspects, optionally, the DMRS ports of all the UEs are classified into at least two DMRS port groups, and quasi co-locations QCLs of DMRS ports in different DMRS port groups are different. The DMRS port allocation rule is a DMRS port allocation rule of any one of the at least two DMRS port groups. For a specific example, refer to the following descriptions.

According to a fifth aspect, UE is provided. The UE may implement functions performed in the example of the DMRS port configuration information obtaining method according to the first aspect. The functions may be implemented by using hardware, or may be implemented by hardware executing corresponding software. The hardware or the software includes one or more modules corresponding to the foregoing functions.

In a possible design, a structure of the UE includes a processor, a memory, a system bus, and a communications interface. The processor is configured to support the UE in performing the corresponding functions in the foregoing method. The communications interface is configured to support communication between the UE and another network element (for example, a base station). The memory is configured to be coupled to the processor, and stores a program instruction and data that are necessary to the UE. The communications interface may be specifically a transceiver.

According to a sixth aspect, an embodiment of the present disclosure provides a computer storage medium, configured to store a computer software instruction corresponding to the DMRS port configuration information obtaining method according to the first aspect. The computer software instruction includes a program configured to execute the fifth aspect.

According to a seventh aspect, a base station is provided. The base station may implement functions performed in the example of the DMRS port configuration information delivery method according to the third aspect. The functions may be implemented by using hardware, or may be implemented by hardware executing corresponding software. The hardware or the software includes one or more modules corresponding to the foregoing functions.

In a possible design, a structure of the base station includes a processor, a memory, a system bus, and a communications interface. The processor is configured to support the base station in performing the corresponding functions in the foregoing method. The communications interface is configured to support communication between the base station and another network element (for example, UE). The memory is configured to be coupled to the processor, and stores a program instruction and data that are necessary to the base station. The communications interface may be specifically a transceiver.

According to an eighth aspect, an embodiment of the present disclosure provides a computer storage medium, configured to store a computer software instruction corresponding to the DMRS port configuration information delivery method according to the third aspect. The computer software instruction includes a program configured to execute the sixth aspect.

It may be understood that any one of the foregoing UE, base station, or computer storage medium is configured to perform the corresponding method provided above. Therefore, for beneficial effects that the UE, base station, or computer storage medium can achieve, refer to the beneficial effects of the corresponding method provided above, and details are not described herein again.

BRIEF DESCRIPTION OF THE DRAWINGS

FIG. 11 is a schematic diagram of another method for delivering DMRS port configuration information according to an embodiment of the present disclosure;

DETAILED DESCRIPTION

Figure 1:
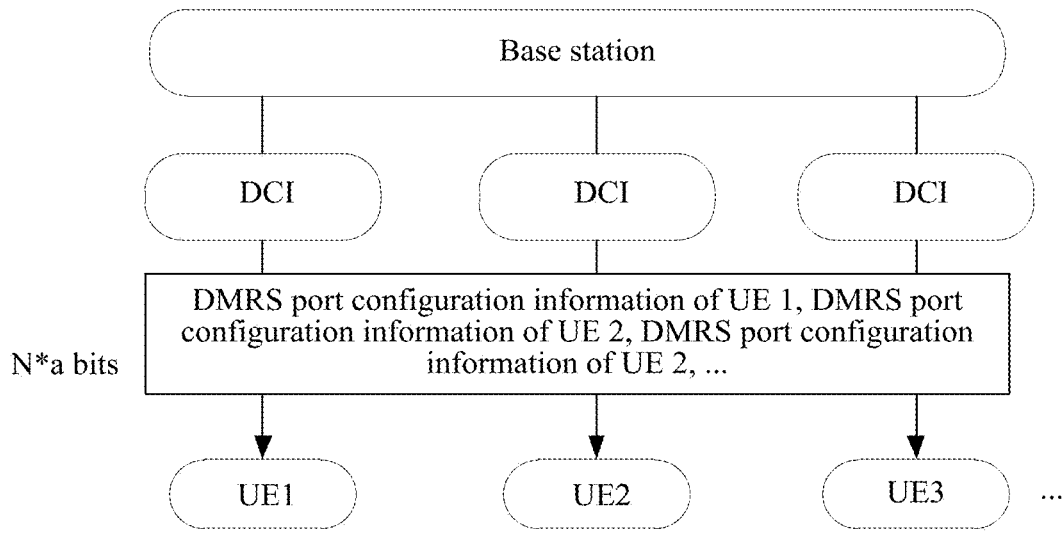
FIG. 1 is a schematic diagram of a method for delivering DMRS port configuration information in the prior art.

DMRS port configuration information in DCI format 2C in an existing LTE protocol is shown in Table 1 and Table 2:

TABLE 1

| One Codeword (one codeword) Codeword 0 enabled, Codeword 1 disabled | | Two Codewords (two codewords) Codeword 0 enabled, Codeword 1 enabled | |
|---|---|---|---|
| Value (value) | Message (message) | Value | Message |
| 0 | 1 layer, port 7, and nSCID = 0 | 0 | 2 layers, ports 7 and 8, and nSCID = 0 |
| 1 | 1 layer, port 7, and nSCID = 1 | 1 | 2 layers, ports 7 and 8, and nSCID = 1 |
| 2 | 1 layer, port 8, and nSCID = 0 | 2 | 3 layers and ports 7 to 9 |
| 3 | 1 layer, port 8, and nSCID = 1 | 3 | 4 layers and ports 7 to 10 |
| 4 | 2 layers and ports 7 and 8 | 4 | 5 layers and ports 7 to 11 |
| 5 | 3 layers and ports 7 to 9 | 5 | 6 layers and ports 7 to 12 |
| 6 | 4 layers and ports 7 to 10 | 6 | 7 layers and ports 7 to 13 |
| 7 | Reserved (reserved) | 7 | 8 layers and ports 7 to 14 |

Based on Table 1, a base station schedules at most two UEs each time, and a maximum value of a quantity of transport layers of each UE is 2. There are six parameter combinations, to be specific, four groups in total that are based on one codeword and whose values are 0 to 3 and two groups in total that are based on two codewords and whose values are 0 and 1, that are necessary for the base station to schedule a plurality of UEs. In this case, a value indicating DMRS port configuration information of one UE may be indicated by using three bits (bits).

TABLE 2

| One Codeword Codeword 0 enabled, Codeword 1 disabled | | Two Codewords Codeword 0 enabled, Codeword 1 enabled | |
|---|---|---|---|
| Value | Message | Value | Message |
| 0 | 1 layer, port 7, and nSCID = 0 (OCC = 2) | 0 | 2 layers, ports 7 and 8, and nSCID = 0 (OCC = 2) |

TABLE 2-continued

| One Codeword Codeword 0 enabled, Codeword 1 disabled | | Two Codewords Codeword 0 enabled, Codeword 1 enabled | |
|---|---|---|---|
| Value | Message | Value | Message |
| 1 | 1 layer, port 7, and nSCID = 1 (OCC = 2) | 1 | 2 layers, ports 7 and 8, and nSCID = 1 (OCC = 2) |
| 2 | 1 layer, port 8, and nSCID = 0 (OCC = 2) | 2 | 2 layers, ports 7 and 8, and nSCID = 0 (OCC = 4) |
| 3 | 1 layer, port 8, and nSCID = 1 (OCC = 2) | 3 | 2 layers, ports 7 and 8, and nSCID = 1 (OCC = 4) |
| 4 | 1 layer, port 7, and nSCID = 0 (OCC = 4) | 4 | 2 layers, ports 11 and 13, nSCID = 0 (OCC = 4) |
| 5 | 1 layer, port 7, and nSCID = 1 (OCC = 4) | 5 | 2 layers, ports 11 and 13, nSCID = 1 (OCC = 4) |
| 6 | 1 layer, port 8, and nSCID = 0 (OCC = 4) | 6 | 3 layers and ports 7 to 9 |
| 7 | 1 layer, port 8, and nSCID = 1 (OCC = 4) | 7 | 4 layers and ports 7 to 10 |
| 8 | 1 layer, port 11, and nSCID = 0 (OCC = 4) | 8 | 5 layers and ports 7 to 11 |
| 9 | 1 layer, port 11, and nSCID = 1 (OCC = 4) | 9 | 6 layers and ports 7 to 12 |
| 10 | 1 layer, port 13, and nSCID = 0 (OCC = 4) | 10 | 7 layers and ports 7 to 13 |
| 11 | 1 layer, port 13, and nSCID = 1 (OCC = 4) | 11 | 8 layers and ports 7 to 14 |
| 12 | 2 layers and ports 7 and 8 | 12 | Reserved |
| 13 | 3 layers and ports 7 to 9 | 13 | Reserved |
| 14 | 4 layers and ports 7 to 10 | 14 | Reserved |
| 15 | Reserved | 15 | Reserved |

Based on Table 2, a base station schedules at most four UEs each time, and a maximum value of a quantity of transport layers of each UE is 2. There are 18 parameter combinations, to be specific, twelve groups in total that are based on one codeword and whose values are 0 to 11 and six groups in total that are based on two codewords and whose values are 0 and 5, that are necessary for the base station to schedule a plurality of UEs. In this case, a value indicating DMRS port configuration information of one UE may be indicated by using five bits (bits).

It may be learned based on Table 1 and Table 2 that as a quantity of UEs scheduled by the base station each time increases, a quantity of necessary parameter combinations increases accordingly. Therefore, a quantity of bits occupied by information indicating the DMRS port configuration information of one UE also increases accordingly. For example, after the quantity of UEs scheduled by the base station each time is increased from 2 to 4, the quantity of bits occupied by the information indicating the DMRS port configuration information of one UE is increased from three bits to five bits.

In the technical solution described in the background, in a specific implementation, the base station needs to send, to each UE, DMRS port configuration information of all UEs scheduled this time (to be specific, through explicit indication), as shown in FIG. 1. An example in which the base station schedules N UEs this time and a quantity of bits occupied by the information indicating the DMRS port configuration information of one UE is a is used in FIG. 1 for description. Information sent by the base station to each of the N UEs includes DMRS port configuration information of each UE.

In the technical solution shown in FIG. 1, an amount of information included in DCI increases as a quantity of UEs scheduled by the base station at a time increases, causing a problem of relatively large signaling overheads.

The signaling overheads may at least be embodied in the following two aspects:

First, a quantity of bits occupied by information used to indicate the DMRS port configuration information of each UE increases. For a specific analysis process, refer to the foregoing analyses on Table 1 and Table 2.

Second, the amount of the information included in the DCI increases. For example, if the base station schedules two UEs at a time, DCI sent by the base station to each UE includes DMRS port configuration information of the two UEs (to be specific, 2*3 bits). If the base station schedules four UEs at a time, DCI sent by the base station to each UE includes DMRS port configuration information of the four UEs (to be specific, 4*5 bits).

Based on the foregoing, embodiments of the present disclosure provide a DMRS port configuration information delivery method, a DMRS port configuration information obtaining method, and an apparatus. A basic principle thereof is: UE is enabled, through implicit indication, to obtain DMRS port configuration information of all UEs scheduled by a base station this time.

The technical solutions provided in the embodiments of the present disclosure may be applied to various communications systems, for example, current 2G, 3G, and 4G communications systems, and a future evolved network system such as a 5G communications system. For example, the various communications systems include a Long Term Evolution (LTE) system, a 3$^{rd}$ Generation Partnership Project (3GPP) related cellular system, and other communications systems of this type. An example in which the technical solutions provided in the embodiments of the present disclosure are applied to the LTE system is used in this specification for description. It should be noted that a 5G standard may include scenarios such as machine to machine (M2M), device-to-machine (D2M), and macro and micro communication. These scenarios may include, but not limited to, a scenario of communication between user equipment and user equipment, a scenario of communication between a base station and a base station, a scenario of communication between a base station and the user equipment, and the like. The technical solutions provided in the embodiments of the present disclosure may also be applied to scenarios such as communication between user equipment and user equipment or communication between a base station and a base station in the 5G communications system.

Figure 2:
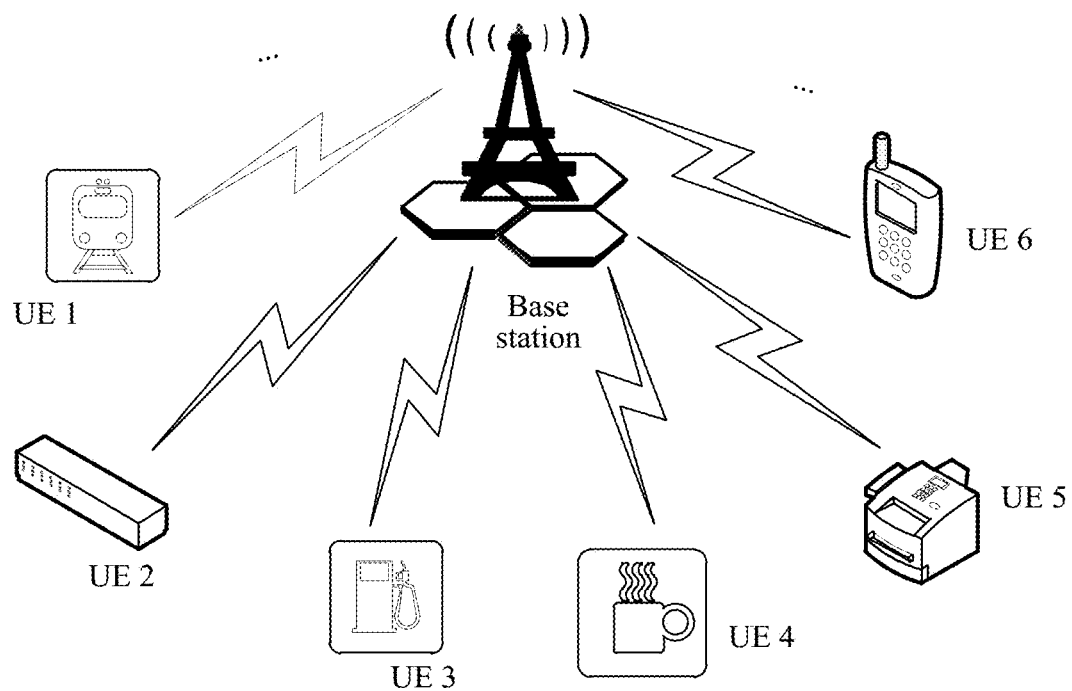
FIG. 2 is a schematic diagram of a system architecture to which a technical solution is applicable according to an embodiment of the present disclosure.

The technical solutions provided in the embodiments of the present disclosure may be applied to a system architecture shown in FIG. 2. The system architecture may include one or more base stations and one or more UEs connected to each base station. An example in which the system architecture includes one base station and a plurality of UEs connected to the base station is used in FIG. 2 for description. The technical solutions provided in the embodiments of the present disclosure are applicable to a scenario in which a base station schedules a plurality of UEs at a time.

DMRS port configurations in the technical solutions provided in the embodiments of the present disclosure may include two manners: an orthogonal DMRS port configuration (referred to as an "orthogonal scenario" below) and a semi-orthogonal DMRS port configuration (referred to as a "semi-orthogonal scenario" below). The orthogonal DMRS port configuration is a DMRS port configuration satisfying that "each data stream for communication between the base station and the plurality of UEs occupies an independent time-frequency resource". The semi-orthogonal DMRS port configuration is a DMRS port configuration satisfying that "some data streams for communication between the base station and the plurality of UEs share some or all time-frequency resources". Therefore, in the semi-orthogonal scenario, different UEs may share a same DMRS port number or a same group of DMRS port numbers.

It should be noted that in a future communications system, the orthogonal DMRS port configuration and the semi-orthogonal DMRS port configuration may be allowed to coexist and may be switched between each other through signaling indication when necessary. For example, at a relatively low frequency, a space multiplex degree is relatively high, and a quantity of layers for data streams that can be simultaneously transmitted is relatively large. In this case, pilot resource overheads can be reduced through application of the semi-orthogonal DMRS port configuration. At a relatively high frequency, a large-scale array antenna gain is mainly used for confrontation to large-scale fading, a space multiplex degree is relatively low, and a quantity of layers for data streams is not large. Therefore, the orthogonal DMRS port configuration may be definitely used with same pilot resource overheads. In addition, in a specific implementation, a DMRS port configuration used by a system may be indicated by using signaling of one or more bits.

In addition, it should be noted that in the semi-orthogonal scenario, different UEs may share a same DMRS port number. To distinguish between time-frequency resources occupied by the UEs, when DMRS ports are configured for the UEs, a DMRS port number and a scrambling code (an identifier) need to be allocated to each UE. An example in which the base station allocates only one scrambling code to one UE is used below for description. Specifically, scrambling codes allocated by the base station to different UEs may be the same or may be different.

The term "a plurality of" in this specification refers to two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates that associated objects have an "or" relationship. In a formula, the character "/" indicates that associated objects have a "division" relationship.

The following describes the technical solutions in the embodiments of the present disclosure by way of examples with reference to the accompanying drawings in the embodiments of the present disclosure. Apparently, the described embodiments are merely some rather than all of the embodiments of the present disclosure.

Figure 3:
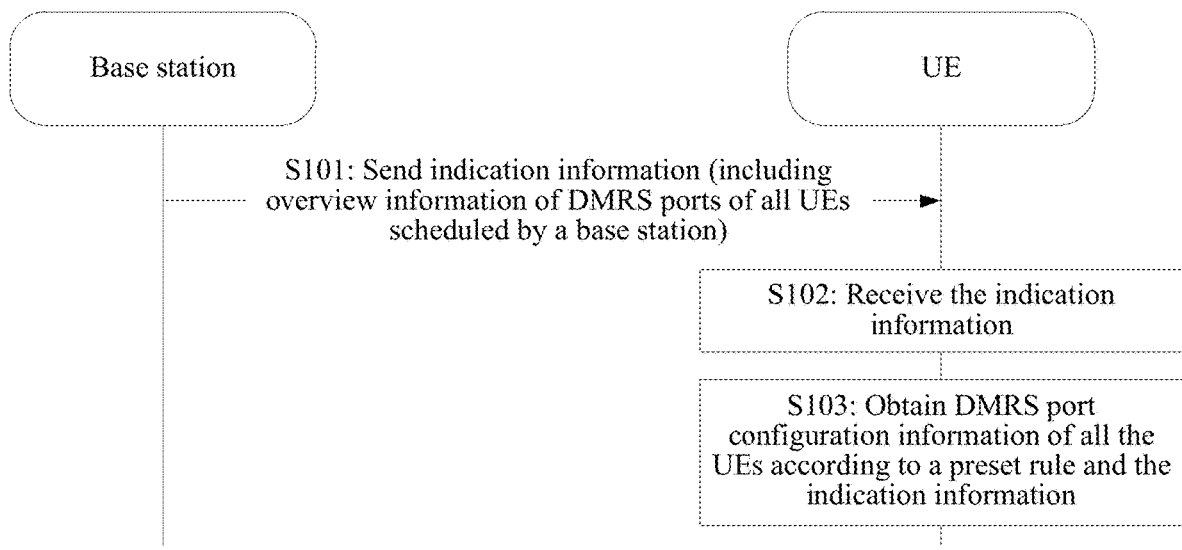
FIG. 3 is a schematic interaction diagram of a DMRS port configuration information obtaining method according to an embodiment of the present disclosure.

FIG. 3 is a schematic interaction diagram of a DMRS port configuration information obtaining method according to an embodiment of the present disclosure. The method shown in FIG. 3 may include the following steps.

S101: A base station sends indication information to UE. The indication information includes overview information of DMRS ports of all UEs scheduled by the base station, to instruct the UE to obtain DMRS port configuration information of all the UEs according to the indication information and a preset rule.

All the UEs scheduled by the base station are all UEs scheduled by the base station at a time. The UE in step S101 may be any one of all the UEs scheduled by the base station.

The overview information of the DMRS ports of all the UEs scheduled by the base station is described relative to detailed information of the DMRS ports of all the UEs scheduled by the base station. The detailed information may be information directly indicating (for example, through explicit indication provided in the background) the DMRS ports of all the UEs. The overview information may be information indirectly indicating (to be specific, through implicit indication) the DMRS ports of all the UEs. Specific content of the overview information is not limited in this embodiment of the present disclosure. For example, different overview information may be set in different scenarios (for example, an orthogonal scenario and a semi-orthogonal scenario). For example, in the orthogonal scenario, each DMRS port corresponds to only one transport layer, and a total quantity of transport layers of all the UEs is equal to a total quantity of DMRS ports occupied by all the UEs. Therefore, the overview information may include the total quantity of transport layers of all the UEs, the total quantity of DMRS ports occupied by all the UEs, and a total quantity of DMRS ports not occupied by all the UEs. For example, in the semi-orthogonal scenario, the overview information may include the total quantity of transport layers of all the UEs and the total quantity of DMRS ports occupied by all the UEs, or may include the total quantity of transport layers of all the UEs and the total quantity of DMRS ports not occupied by all the UEs. For specific examples of the two examples, refer to the following descriptions.

In the orthogonal scenario, DMRS port configuration information of UE may include a DMRS port number allocated by the base station to the UE. In the semi-orthogonal scenario, DMRS port configuration information of UE may include a DMRS port number and a scrambling code identifier corresponding to the DMRS port number that are allocated by the base station to the UE.

In step S101, the base station may send the indication information to the UE by using a new message, or may send the indication information to the UE by reusing a message in the prior art. For example, the base station sends downlink control information (DCI) to the UE, and the DCI includes the indication information.

Figure 4:
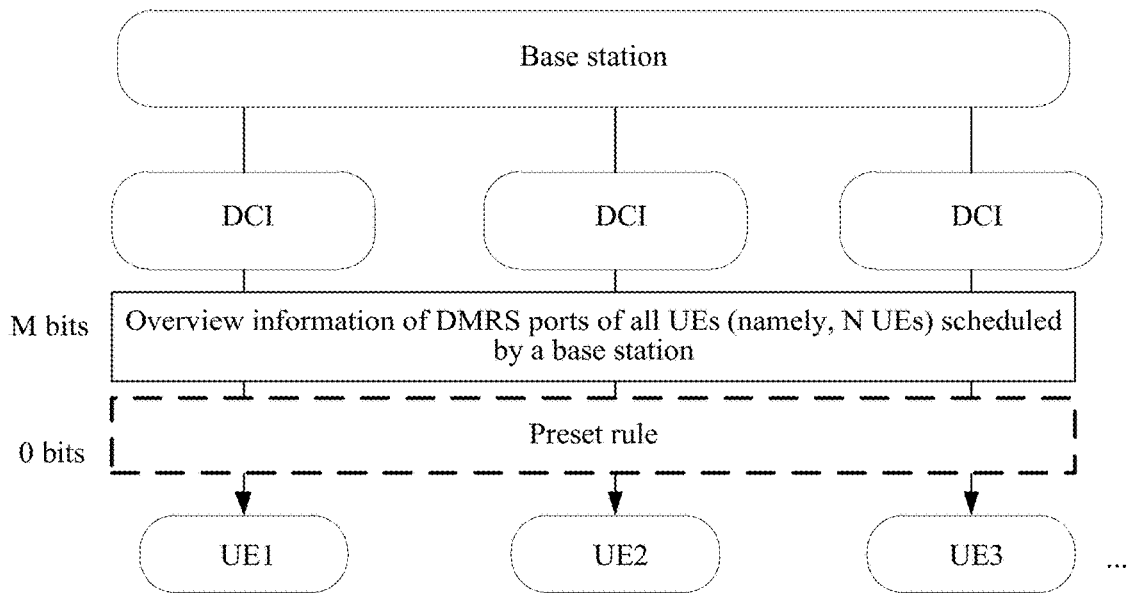
FIG. 4 is a schematic diagram of a method for delivering DMRS port configuration information according to an embodiment of the present disclosure.

In a specific implementation, the base station may send the indication information to each of all the UEs. In this case, a function of the indication information may be described as: instructing UE that receives the indication information to obtain the DMRS port configuration information of all the UEs according to the indication information and the preset rule. Details may be shown in FIG. 4. An example in which the indication information includes M bits is used in FIG. 4 for description. M is an integer greater than or equal to 0. An example in which the indication information is carried in DCI is used in FIG. 4, but the example does not constitute a limitation.

S102: The UE receives the indication information sent by the base station.

S103: The UE obtains the DMRS port configuration information of all the UEs according to the preset rule and the indication information.

The preset rule is a rule agreed upon by the base station and the UE in advance. In an actual implementation, the base station configures a DMRS port for the UE according to the preset rule, and the UE obtains, based on the preset rule and the overview information in the indication information, the DMRS port configuration information of all the UEs scheduled this time. In the orthogonal scenario, the DMRS port configuration information in this embodiment of the present disclosure includes a DMRS port number. In the semi-orthogonal scenario, the DMRS port configuration information in this embodiment of the present disclosure includes a DMRS port number and a scrambling code corresponding to the DMRS port number. Specific content of the preset rule is not limited in this embodiment of the present disclosure. For example, different preset rules may be set based on different DMRS port configuration information of the UE in different scenarios (for example, the orthogonal scenario and the semi-orthogonal scenario). For example, in the orthogonal scenario, the preset rule may include a DMRS port allocation rule, to be specific, a rule of allocating a DMRS port number to the UE by the base station. In the semi-orthogonal scenario, the preset rule may include a DMRS port allocation rule and a scrambling code allocation rule. The scrambling code allocation rule is a rule of allocating a scrambling code to the UE by the base station. In addition, optionally, in the semi-orthogonal scenario, the preset rule may further include a relationship between the DMRS port allocation rule and the scrambling code allocation rule, for example, a relationship between different scrambling codes and different quantities of DMRS ports.

In the DMRS port configuration information obtaining method provided in this embodiment of the present disclosure, the UE obtains the DMRS port configuration information of all the UEs based on the preset rule and the overview information that is indicated by the base station and that is of the DMRS ports of all the UEs scheduled by the base station. Compared with the prior art, to be specific, that the base station indicates, to the UE, the detailed information of the DMRS ports of all the UEs scheduled by the base station, in the technical solution provided in this embodiment of the present disclosure, the information indicated by the base station to UE includes less content. Therefore, signaling overheads can be reduced.

Figure 5:
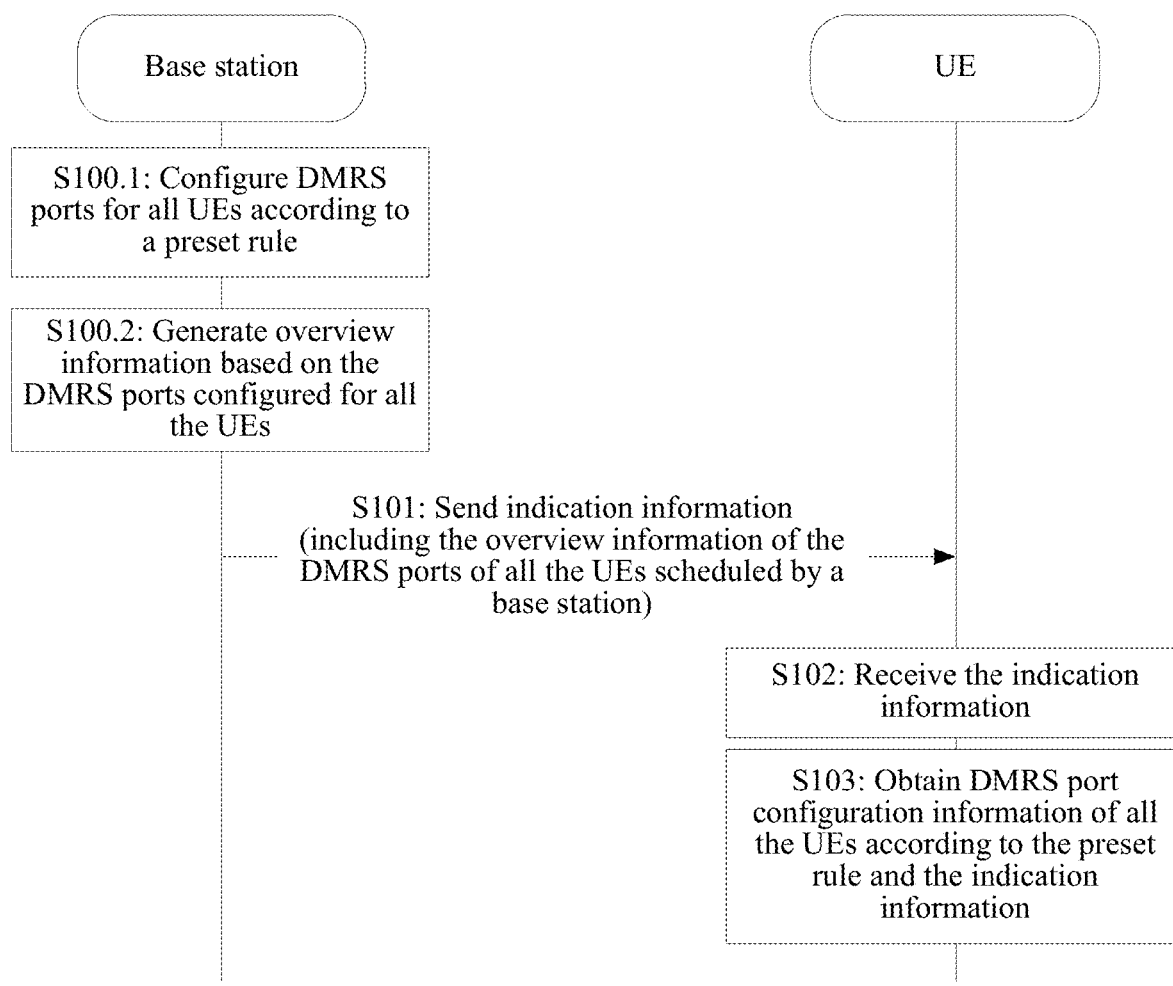
FIG. 5 is a schematic interaction diagram of another DMRS port configuration information obtaining method according to an embodiment of the present disclosure.

As shown in FIG. 5, before step S101, the method may further include step S100.1 and step S100.2.

S100.1: The base station configures the DMRS ports for all the UEs according to the preset rule. In the orthogonal scenario, configuring a DMRS port for UE means allocating a DMRS port number to the UE. In the semi-orthogonal scenario, configuring a DMRS port for UE means allocating a DMRS port number and a scrambling code to the UE.

S100.2: The base station generates the overview information based on the DMRS ports configured for all the UEs.

The preset rule, a method for configuring DMRS configuration information by the base station based on the preset rule, and a method for obtaining DMRS configuration information by the UE based on the preset rule are described below as examples. Specifically, any one of the following manners may be included.

It should be noted that in a specific implementation, the base station and the UE may learn of preset DMRS port numbers (including a total quantity of DMRS port numbers and a range of the DMRS port numbers) and preset scrambling codes (including a total quantity of scrambling codes and a range of the scrambling codes) in a manner in the prior art. The preset DMRS port numbers are DMRS port numbers that are preset in the base station and UE and that can be used in a process of allocating the DMRS ports by the base station this time. It should be noted that after a protocol of communication between the base station and the UE is determined, the base station and the UE may determine the preset scrambling codes and preset DMRS ports. The preset scrambling codes are scrambling codes that are preset in the base station and UE and that can be used in the process of allocating the DMRS ports by the base station this time. An example in which the technical solution provided in this embodiment of the present disclosure is applied to the semi-orthogonal scenario and the preset scrambling codes are a scrambling code 0 and a scrambling code 1 is used in the following examples for description.

Manner 1:

In Manner 1, the preset rule may include the DMRS port allocation rule and the scrambling code allocation rule. In this case, step S100.1 may include the following step S1 and step S2.

S1: The base station allocates DMRS port numbers to all the UEs according to a DMRS port allocation rule. Specifically, the base station allocates the DMRS port numbers to all the UEs based on the DMRS port allocation rule, the preset DMRS port numbers, and a quantity of transport layers of each of all the UEs.

A specific implementation of the DMRS port allocation rule is not limited in this embodiment of the present disclosure, and may specifically include, but not limited to, any one of the following information: a rule of continuously allocating DMRS port numbers in ascending order, a rule of continuously allocating DMRS port numbers in descending order, a rule of allocating DMRS port numbers in ascending order of first odd and then even numbers or first even and then odd numbers, and a rule of allocating DMRS port numbers in descending order of first odd and then even numbers or first even and then odd numbers.

The "continuously" herein refers to continuity in terms of a range of the preset DMRS port numbers instead of absolute numbers. For example, assuming that a set including the preset DMRS port numbers is {#1, #2, #3, #7, #8, #9, #19, #20}, port numbers #3 and #7 are two continuous DMRS port numbers, port numbers #9 and #19 are also two continuous DMRS port numbers, and so on. That "first odd and then even numbers or first even and then odd numbers" is "first odd and then even numbers or first even and then odd numbers" in terms of a range of the preset DMRS port numbers instead of absolute numbers. In addition, "allocation in an order of first odd and then even numbers or first even and then odd numbers" may be allocation in an order of first odd numbers and then even numbers or may be allocation in an order of first even numbers and then odd numbers. For example, if the "allocation in an order of first odd and then even numbers or first even and then odd numbers" is the allocation in the order of first odd numbers and then even numbers, assuming that a set including the preset DMRS port numbers is {#1, #2, #3, #7, #8, #9, #19, #20}, the allocating the DMRS port numbers in ascending order of first odd and then even numbers or first even and then odd numbers may include: allocating the DMRS port numbers in the following order of #1, #3, #8, #19, #2, #7, #9, and #20; and the allocating the DMRS port numbers in descending order of first odd and then even numbers or first even and then odd numbers may include: allocating the DMRS port numbers in the following order of #19, #8, #3, #1, #20, #9, #7, and #2. Other examples are not listed herein one by one.

S2: The base station allocates, to all the UEs according to a scrambling code allocation rule, scrambling codes corresponding to the DMRS port numbers.

A specific implementation of the scrambling code allocation rule is not limited in this embodiment of the present disclosure, and may specifically include, but not limited to, any one of the following information: a rule of continuously allocating scrambling codes in ascending order, a rule of continuously allocating scrambling codes in descending order, a rule of allocating scrambling codes in ascending order of first odd and then even numbers or first even and then odd numbers, and a rule of allocating scrambling codes in descending order of first odd and then even numbers or first even and then odd numbers.

The "continuously" herein is continuity in terms of a range of the preset scrambling codes instead of absolute numbers. For example, assuming that a set including the preset scrambling codes is {0, 1, 3}, the scrambling codes 1 and 3 are two continuous scrambling codes. For specific explanations of "first odd and then even numbers or first even and then odd numbers" and "allocation in an order of first odd and then even numbers or first even and then odd numbers", refer to the foregoing descriptions, and details are not described herein again. It should be noted that in an actual implementation, a quantity of preset scrambling codes may be greater than or equal to 2. An example in which the quantity of preset scrambling codes is 2 is used below for description.

In Manner 1, the overview information generated in step S100.2 may include the total quantity of transport layers of all the UEs and the total quantity of DMRS ports occupied by all the UEs. Alternatively, the overview information generated in step S100.2 may include the total quantity of transport layers of all the UEs and the total quantity of DMRS ports not occupied by all the UEs.

Figure 6:
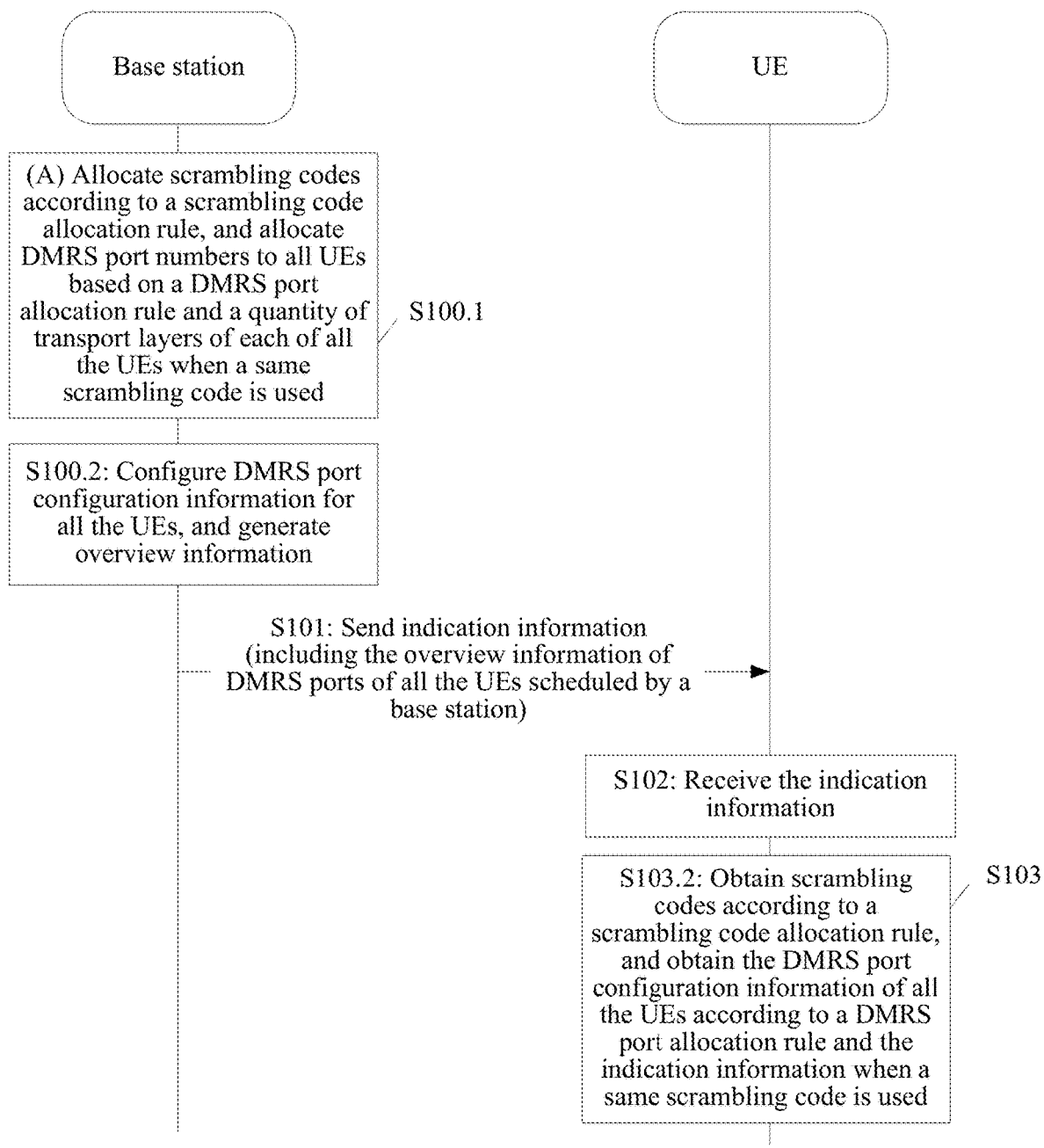
FIG. 6 is a schematic interaction diagram of another DMRS port configuration information obtaining method according to an embodiment of the present disclosure.
Figure 7:
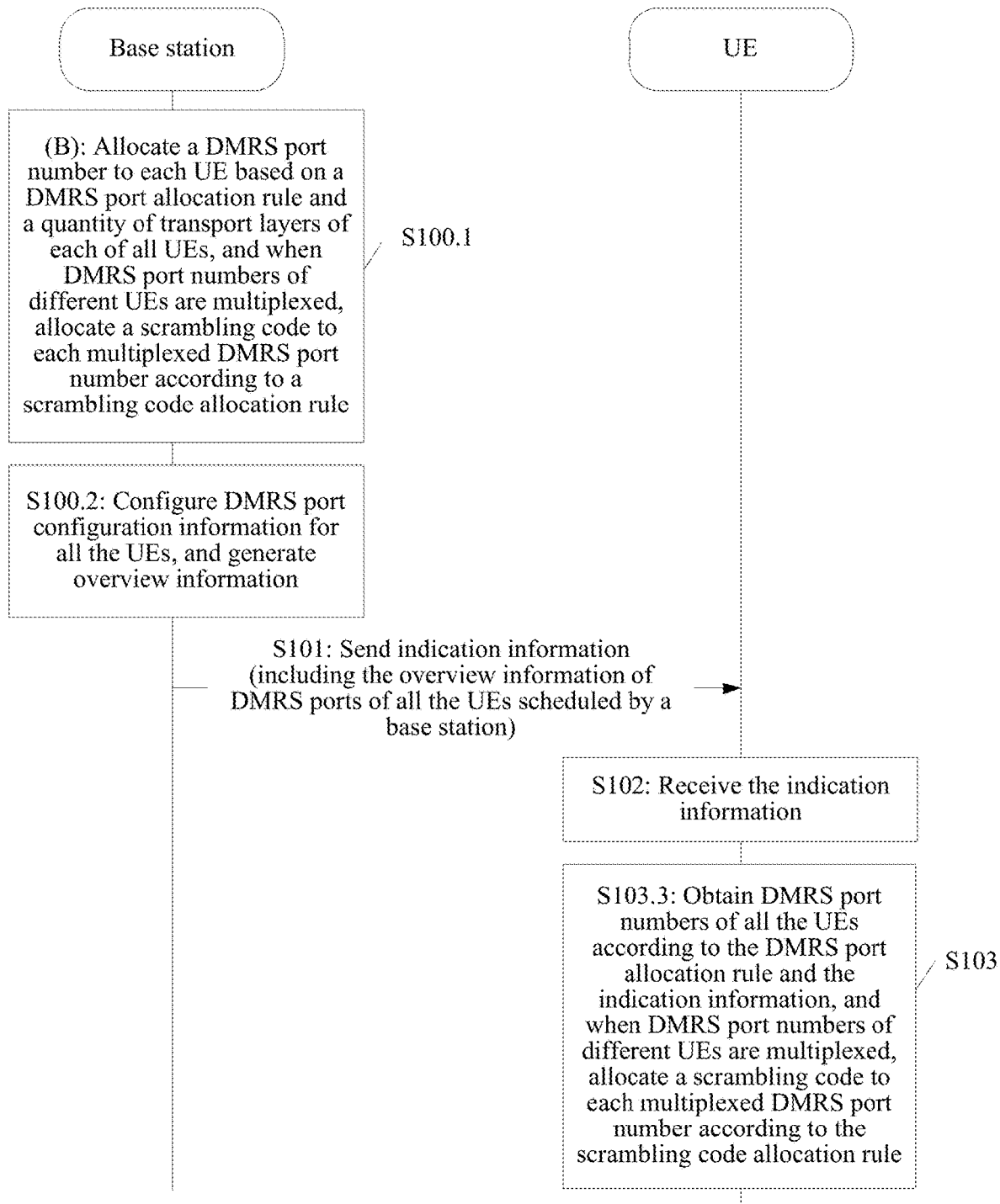
FIG. 7 is a schematic interaction diagram of another DMRS port configuration information obtaining method according to an embodiment of the present disclosure.

An execution order of step S1 and step S2 is not limited in this embodiment of the present disclosure. Optionally, step S1 and step S2 may be implemented by using the following step (A) or step (B). To be specific, step S100.1 may be implemented by using the following step (A), as shown in FIG. 6; or may be implemented by using the following step (B), as shown in FIG. 7.

Step (A): The base station allocates the scrambling codes according to the scrambling code allocation rule, and allocates the DMRS port numbers to all the UEs based on the DMRS port allocation rule and the quantity of transport layers of each of all the UEs when a same scrambling code is used. Specifically, the base station allocates the scrambling codes according to the scrambling code allocation rule, and allocates the DMRS port numbers to all the UEs based on the DMRS port allocation rule, the preset DMRS port numbers, and the quantity of transport layers of each of all the UEs when the same scrambling code is used.

Corresponding to step (A), step S103 may include step S103.2: The UE obtains the scrambling codes according to the scrambling code allocation rule, and obtains the DMRS port configuration information of all the UEs based on the DMRS port allocation rule and the overview information when the same scrambling code is used, as shown in FIG. 6.

It is assumed that there is a following scenario 1 in which a set including the preset DMRS port numbers is {#0, #1, #2, #3}, a set including the preset scrambling codes is {0, 1}, the total quantity of transport layers of all the UEs (specifically, three UEs) scheduled by the base station this time is 6, and quantities of transport layers of the three UEs (to be specific, UE 1, UE 2, and UE 3) are respectively 3, 1, and 2.

In this embodiment, the DMRS port allocation rule is the rule of continuously allocating DMRS port numbers in ascending order, and the scrambling code allocation rule is the rule of continuously allocating scrambling codes in ascending order.

In the scenario 1, the DMRS ports configured by the base station for all the UEs by performing step (A) may be shown in Table 3A:

TABLE 3A

|  | UE identifier | | | | | |
|---|---|---|---|---|---|---|
|  | UE 3 | | UE 2 | UE 1 | | |
| DMRS port number | #0 | #1 | #2 | #0 | #1 | #2 |
| Scrambling code | 0 | 0 | 0 | 1 | 1 | 1 |

Based on Table 3A, the overview information generated in step S100.2 may include the total quantity of transport layers of all the UEs that is 6 and the total quantity of DMRS ports occupied by all the UEs that is 3. In this case, in step S103, a scrambling code sequence obtained by the UE according to the rule of continuously allocating scrambling codes in ascending order is 0 and 1. When the same scrambling code is used, DMRS port numbers corresponding to one scrambling code that are obtained according to the rule of continuously allocating DMRS port numbers in ascending order and the total quantity of DMRS ports occupied by all the UEs that is 3 are #0, #1, and #2. Based on the foregoing, DMRS port numbers corresponding to the other scrambling code that are obtained based on the total quantity of transport layers of all the UEs that is 6 are #0, #1, and #2, as shown in Table 3B.

TABLE 3B

| DMRS port number | #0 | #1 | #2 | #0 | #1 | #2 |
|---|---|---|---|---|---|---|
| Scrambling code | 0 | 0 | 0 | 1 | 1 | 1 |

Step (B): The base station allocates a DMRS port number to each UE based on the DMRS port allocation rule and the quantity of transport layers of each of all the UEs, and when DMRS port numbers of different UEs are multiplexed, allocates a scrambling code to each multiplexed DMRS port number according to the scrambling code allocation rule.

Corresponding to step (B), step S103 may include step S103.3: The UE obtains the DMRS port numbers of all the UEs based on the DMRS port allocation rule and the overview information, and when the DMRS port numbers of different UEs are multiplexed, allocates the scrambling code to each multiplexed DMRS port number according to the scrambling code allocation rule, as shown in FIG. 7.

In the scenario 1, the DMRS ports configured by the base station for all the UEs by performing step (B) may be shown in Table 4:

TABLE 4

| | UE identifier | | | | | |
|---|---|---|---|---|---|---|
| | UE 1 | | | UE 2 | | UE 3 |
| DMRS port number | #0 | #1 | #2 | #0 | #1 | #2 |
| Scrambling code | 0 | 0 | 0 | 1 | 1 | 1 |

Based on Table 4, the overview information generated in step S100.2 may include the total quantity of transport layers of all the UEs that is 6 and the total quantity of DMRS ports occupied by all the UEs that is 3. In this case, the DMRS port configuration information of all the UEs that is obtained in step S103 is shown in Table 3B. For details, refer to the foregoing descriptions.

Manner 2:

In Manner 2, the preset rule may include the DMRS port allocation rule, the scrambling code allocation rule, and a rule that a quantity of DMRS ports corresponding to a previously allocated scrambling code is greater than or equal to a quantity of DMRS ports corresponding to a subsequently allocated scrambling code. Alternatively, the preset rule may include the DMRS port allocation rule, the scrambling code allocation rule, and a rule that a quantity of DMRS ports corresponding to a subsequently allocated scrambling code is greater than or equal to a quantity of DMRS ports corresponding to a previously allocated scrambling code. For explanations of related content in this application, refer to Manner 1, and details are not described herein again.

In the scenario 1, if the preset rule includes the DMRS port allocation rule, the scrambling code allocation rule, and the rule that the quantity of DMRS ports corresponding to the previously allocated scrambling code (namely, the scrambling code 0) is greater than or equal to the quantity of DMRS ports corresponding to the subsequently allocated scrambling code (namely, the scrambling code 1), the DMRS ports configured by the base station for all the UEs may be shown in Table 5A.

TABLE 5A

| | UE identifier | | | | | |
|---|---|---|---|---|---|---|
| | UE 1 | | | UE 2 | | UE 3 |
| DMRS port number | #0 | #1 | #2 | #3 | #0 | #1 |
| Scrambling code | 0 | 0 | 0 | 0 | 1 | 1 |

In this case, the overview information generated in step S100.2 may include the total quantity of DMRS ports occupied by all the UEs that is 4 and the total quantity of transport layers of all the UEs that is 6. In step S103, a scrambling code sequence obtained by the UE according to the rule of continuously allocating scrambling codes in ascending order is 0 and 1. When the same scrambling code is used, DMRS port numbers corresponding to a scrambling code that are obtained according to the rule of continuously allocating DMRS port numbers in ascending order, the total quantity of DMRS ports occupied by all the UEs that is 4, and the total quantity of transport layers of all the UEs that is 6 are #0, #1, #2, and #3, and DMRS port numbers corresponding to the other scrambling code are #0 and #1. Next, the DMRS port configuration information of all the UEs that is obtained based on the rule that the quantity of DMRS ports corresponding to the previously allocated scrambling code is greater than or equal to the quantity of DMRS ports corresponding to the subsequently allocated scrambling code is shown in Table 5B.

TABLE 5B

| DMRS port number | #0 | #1 | #2 | #3 | #0 | #1 |
|---|---|---|---|---|---|---|
| Scrambling code | 0 | 0 | 0 | 0 | 1 | 1 |

Manner 3:

Based on the preset rule provided in Manner 1 or Manner 2, optionally, in a scenario satisfying that a maximum quantity of transport layers of each UE is 2 and a total quantity of preset DMRS ports is an even number greater than 0, the overview information may include only the total quantity of transport layers of all the UEs.

Specifically, after a plurality of UEs satisfying the condition that "the maximum quantity of transport layers of each UE is 2 and the total quantity of preset DMRS ports is an even number greater than 0" are particularly sorted, all the preset DMRS ports can always be occupied, and that all the preset DMRS ports can be occupied by all the UEs indicates that the total quantity of DMRS ports occupied by all the UEs is equal to the total quantity of preset DMRS ports. In addition, the base station and the UE may obtain the total quantity of preset DMRS ports in the manner provided in the prior art. Therefore, the overview information may not include the total quantity of DMRS ports occupied by all the UEs and the total quantity of DMRS ports not occupied by all the UEs. In other words, the overview information may include only the total quantity of transport layers of all the UEs.

It is assumed that there is a following scenario in which a set including the preset DMRS port numbers is {#0, #1, #2, #3}, a set including the preset scrambling codes is {0, 1}, the total quantity of transport layers of all the UEs (specifically, three UEs) scheduled by the base station this time is 5, and quantities of transport layers of the three UEs (to be specific, UE 4, UE 5, and UE 6) are respectively 2, 2, and 1. The preset rule includes the rule of continuously allocating DMRS port number in ascending order, the rule of continuously allocating scrambling codes in ascending order, and the rule that a quantity of DMRS ports corresponding to a previously allocated scrambling code is greater than or equal to a quantity of DMRS ports corresponding to a subsequently allocated scrambling code. The DMRS ports configured by the base station for all the UEs may be shown in Table 6A.

TABLE 6A

| | UE identifier | | | | |
|---|---|---|---|---|---|
| | UE 4 | | UE 5 | | UE 6 |
| DMRS port number | #0 | #1 | #2 | #3 | #0 |
| Scrambling code | 0 | 0 | 0 | 0 | 1 |

Based on Table 6A, the overview information generated in step S100.2 may include the total quantity of transport layers of all the UEs that is 5. In this case, in step S103, a scrambling code sequence obtained by the UE according to the rule of continuously allocating scrambling codes in ascending order is 0 and 1. When the same scrambling code is used, DMRS port numbers corresponding to a scrambling code that are obtained according to the rule of continuously allocating DMRS port numbers in ascending order and a condition that all the preset DMRS ports can be occupied by all the UEs are #0, #1, #2, and #3, and a DMRS port number that corresponds to the other scrambling code and that is obtained based on the total quantity of DMRS ports occupied by all the UEs that is 5 is #0. Next, the DMRS port configuration information of all the UEs that is obtained based on the rule that the quantity of DMRS ports corresponding to the previously allocated scrambling code (namely, the scrambling code 0) is greater than or equal to the quantity of DMRS ports corresponding to the subsequently allocated scrambling code (namely, the scrambling code 1) is shown in Table 6B.

TABLE 6B

| DMRS port number | #0 | #1 | #2 | #3 | #0 |
|---|---|---|---|---|---|
| Scrambling code | 0 | 0 | 0 | 0 | 1 |

Figure 8:
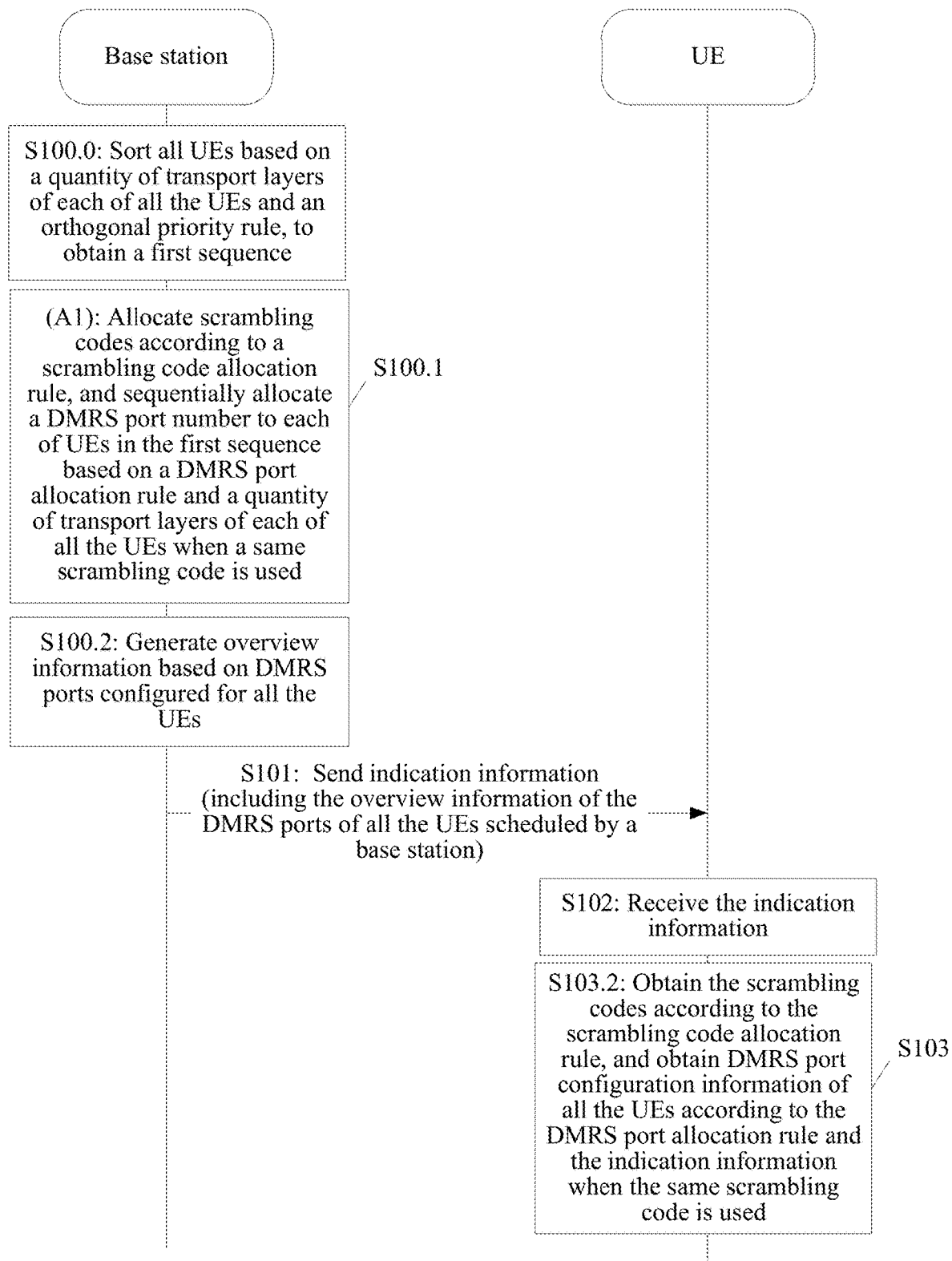
FIG. 8 is a schematic interaction diagram of another DMRS port configuration information obtaining method according to an embodiment of the present disclosure.

Manner 4:

Optionally, as shown in FIG. 8, before step (A) is performed, the method may further include the following step:

S100.0: The base station sorts all the UEs, to obtain at least two sequences, and then selects a first sequence from the at least two sequences according to an orthogonal priority rule. The orthogonal priority rule is a rule that a quantity of DMRS ports corresponding to a previously allocated scrambling code accounts for a maximum proportion of the total quantity of DMRS ports allocated to all the UEs or a rule that a quantity of DMRS ports corresponding to a subsequently allocated scrambling code accounts for a maximum proportion of the total quantity of DMRS ports allocated to all the UEs.

In this case, step (A) may include step (A1): The base station allocates the scrambling codes according to the scrambling code allocation rule, and sequentially allocates the DMRS port number to each of UEs in the first sequence based on the DMRS port allocation rule and the quantity of transport layers of each of all the UEs when the same scrambling code is used.

Specifically, the base station sorts the plurality of UEs to obtain N sequences, where N is an integer greater than or equal to 2, and then performs the following operations on each of the N sequences: allocating, according to the preset rule in Manner 2 or Manner 3, the DMRS ports to all the UEs scheduled this time, and determining a proportion S; and at last, comparing N proportions S obtained based on the N sequences, and using a sequence corresponding to the largest S as the first sequence. The proportion S may be a proportion of the quantity of DMRS ports corresponding to the previously allocated scrambling code in the total quantity of allocated DMRS ports, or a proportion that is of the quantity of DMRS ports corresponding to the subsequently allocated scrambling code in the total quantity of allocated DMRS ports and that is obtained based on the sequences. It should be noted that this optional implementation may be understood as: before performing a method for actually allocating the DMRS ports in step (A), pre-allocating (also referred to as simulating to allocate), by the base station, the DMRS ports to all the UEs based on the at least two sequences according to the preset rule; and then selecting, from the at least two sequences according to the orthogonal priority rule, a sequence used when actually allocating the DMRS ports in step (A).

For example, based on the scenario 1, the following six sequences may be obtained after the base station sorts all the UEs. The six sequences are a sequence 1: UE 1, UE 2, and UE 3, a sequence 2: UE 1, UE 3, and UE 2, a sequence 3: UE 2, UE 1, and UE 3, a sequence 4: UE 2, UE 3, and UE 1, a sequence 5: UE 3, UE 1, and UE 2, and a sequence 6: UE 3, UE 2, and UE 1. DMRS ports allocated by the base station to all the UEs based on the sequence 1 may be shown in Table 5A, . . . , and DMRS ports allocated by the base station to all the UEs based on the sequence 6 may be shown in Table 3A. A proportion S obtained by the base station based on the sequence 1 is 3/4, . . . , and a proportion S obtained by the base station based on the sequence 6 is 1. In this case, the base station may use the sequence 6 (to be specific, the UE 1, the UE 2, and the UE 3) as the first sequence.

It should be noted that if there are a plurality of maximum S in the obtained N proportions S, any one of the sequences corresponding to the plurality of maximum S may be used as the first sequence. In addition, in this optional implementation, data streams for communication between all the UEs scheduled this time and the base station can be maximally orthogonal, to reduce interference of data streams between different UEs, thereby improving system performance.

In any one of the foregoing DMRS port configuration information delivery/obtaining methods, the DMRS port configuration information obtained by the UE includes the DMRS port numbers used by all the UEs scheduled by the base station this time, and optionally, may further include scrambling code identifiers corresponding to the DMRS port numbers used by all the UEs scheduled by the base station this time. To enable the UE to distinguish DMRS port configuration information of the UE from DMRS port configuration information of another UE, optionally, the method may further include: sending, by the base station, the DMRS port configuration information of the UE. Specifically, the base station may send the DMRS port configuration information of the UE to the UE by using DCI. The DMRS port configuration information of the UE may include a DMRS port number allocated by the base station to the UE. Optionally, the DMRS port configuration information of the UE may further include a scrambling code identifier corresponding to the DMRS port number allocated by the base station to the UE. The DCI may be the same as or different from the foregoing DCI used to send the indication information in step S101.

Figure 9:
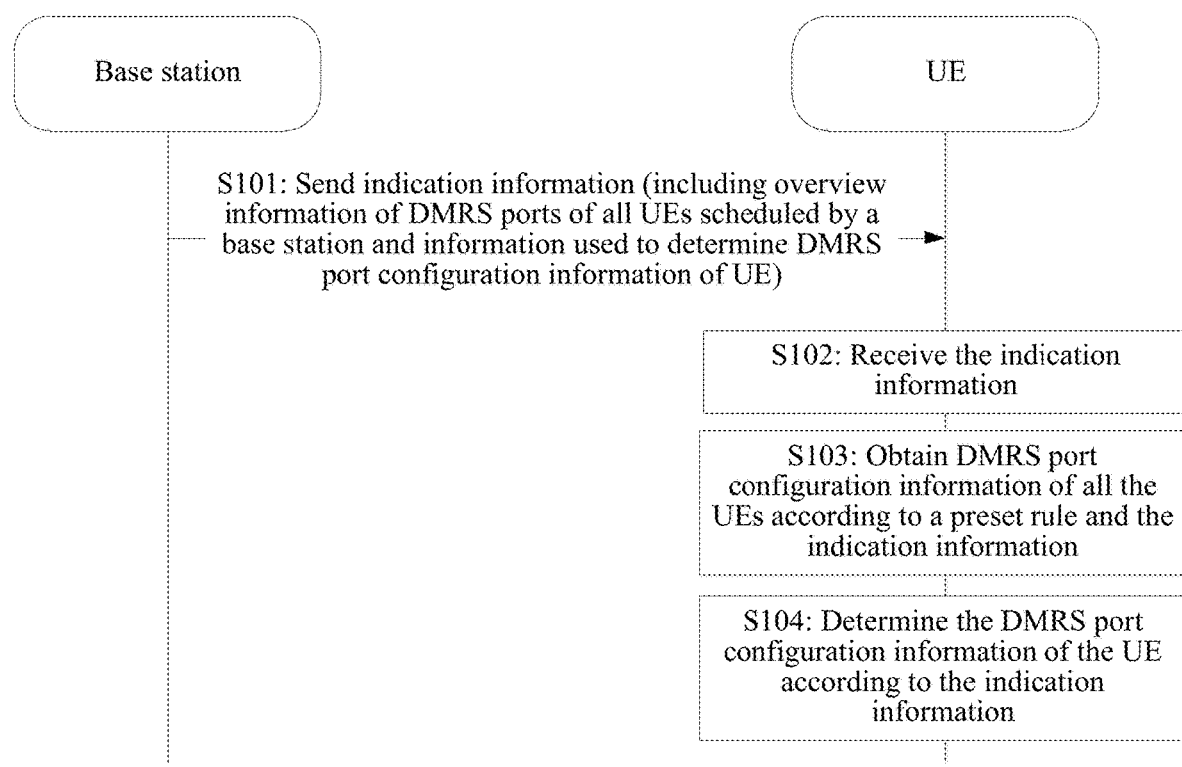
FIG. 9 is a schematic interaction diagram of another DMRS port configuration information obtaining method according to an embodiment of the present disclosure.

In addition, this embodiment of the present disclosure further provides a method for determining the DMRS port configuration information of the UE by the UE. Specifically, the indication information in step S101 may further include information used to determine the DMRS port configuration information of the UE. In this case, as shown in FIG. 9, the method may further include the following step S104. FIG. 9 is drawn based on FIG. 3.

S104: The UE determines DMRS port configuration information of the UE according to the indication information.

For example, the information used to determine the DMRS port configuration information of the UE may include: a maximum DMRS port number allocated to the UE and a quantity of transport layers of the UE, or a minimum DMRS port number allocated to the UE and a quantity of transport layers of the UE. It should be noted that, theoretically, the information used to determine the DMRS port configuration information of the UE includes any DMRS port number allocated to the UE and the quantity of transport layers of the UE. The any DMRS port number allocated to the UE is a DMRS port number agreed upon by the base station and the UE in advance.

Further, the information used to determine the DMRS port configuration information of the UE may further include a scrambling code identifier allocated to the UE.

Figure 10:
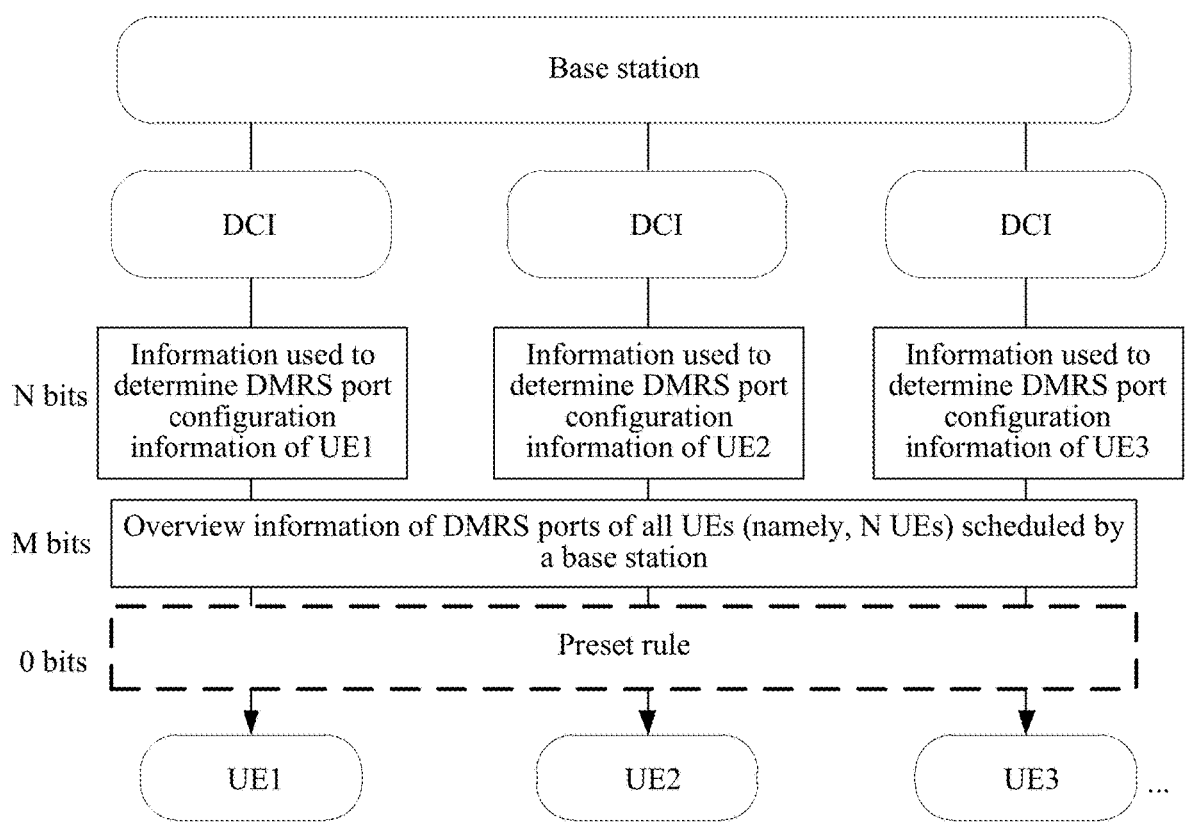
FIG. 10 is a schematic diagram of another method for delivering DMRS port configuration information according to an embodiment of the present disclosure.

In this optional implementation, information included in the indication information sent by the base station to the UEs is different, and may specifically include the overview information (namely, common information) of the DMRS ports of all the UEs scheduled by the base station and the information used to determine the DMRS port configuration information of the UE, as shown in FIG. 10. FIG. 10 is drawn based on FIG. 4. An example in which information used to determine DMRS port configuration information of UE is N bits is used in FIG. 10 for description. N is an integer greater than or equal to 0.

For example, assuming that the base station configures the DMRS port configuration information of all the UEs in the manner shown in Table 3, indication information sent by the base station to target UE may include information used to determine DMRS port configuration information of the target UE (where the information is user-dedicated information) and common information. The common information includes a total quantity of transport layers that is 6 (represented by a binary numeral 101) and a total quantity of DMRS ports occupied by the three UEs that is 4 (represented by a binary numeral 11).

In addition, if the target UE is the UE 1, the information used to determine the DMRS port configuration information of the target UE may include a minimum DMRS port number #0 (represented by a binary numeral 00) of the UE 1, a quantity of transport layers of the UE 1 that is 3 (represented by a binary numeral 10), and a scrambling code identifier of the UE 1 that is 0 (represented by a binary numeral 0), as shown in (a) of FIG. 11.

If the target UE is the UE 2, the information used to determine the DMRS port configuration information of the target UE may include a minimum DMRS port number #3 (represented by a binary numeral 10) of the UE 2, a quantity of transport layers of the UE 2 that is 1 (represented by a binary numeral 00), and a scrambling code identifier of the UE 2 that is 0 (represented by a binary numeral 00), as shown in (b) of FIG. 11.

If the target UE is the UE 3, the information used to determine the DMRS port configuration information of the target UE may include a minimum DMRS port number #0 (represented by a binary numeral 10) of the UE 3, a quantity of transport layers of the UE 3 that is 2 (represented by a binary numeral 01), and a scrambling code identifier of the UE 3 that is 1, as shown in (c) of FIG. 11.

In this optional implementation, the UE can distinguish the DMRS port configuration information of the UE from the DMRS port configuration information of the another UE. Compared with that the base station indicates the DMRS port configuration information of the UE to the UE through explicit indication, signaling overheads can be reduced. Particularly, when a quantity of UEs scheduled by the base station at a time is relatively large, beneficial effects that can be achieved in this optional implementation are more obvious. Subsequently, the UE may determine an interference value of interference of a data stream for communication between the another UE and the base station to a data stream for communication between the UE and the base station by using the DMRS port configuration information of the UE and the DMRS port configuration information of the another UE. Certainly, in a specific implementation, the UE may further apply the DMRS port configuration information of the UE and the DMRS port configuration information of the other UE to another scenario. This is not limited in this embodiment of the present disclosure.

Manner 1 and Manner 2 are both described by using an example in which the technical solution provided in this embodiment of the present disclosure is applied to the semi-orthogonal scenario. Descriptions are provided below by using an example in which the technical solution provided in this embodiment of the present disclosure is applied to the orthogonal scenario.

In the orthogonal scenario, the preset rule may include the DMRS port allocation rule. In this case, step S100.1 may include the following step S1.

S1: The base station allocates DMRS port numbers to all the UEs according to a DMRS port allocation rule. Specifically, the base station allocates the DMRS port numbers to all the UEs based on the DMRS port allocation rule, the preset DMRS port numbers, and a quantity of transport layers of each of all the UEs.

Figure 12:
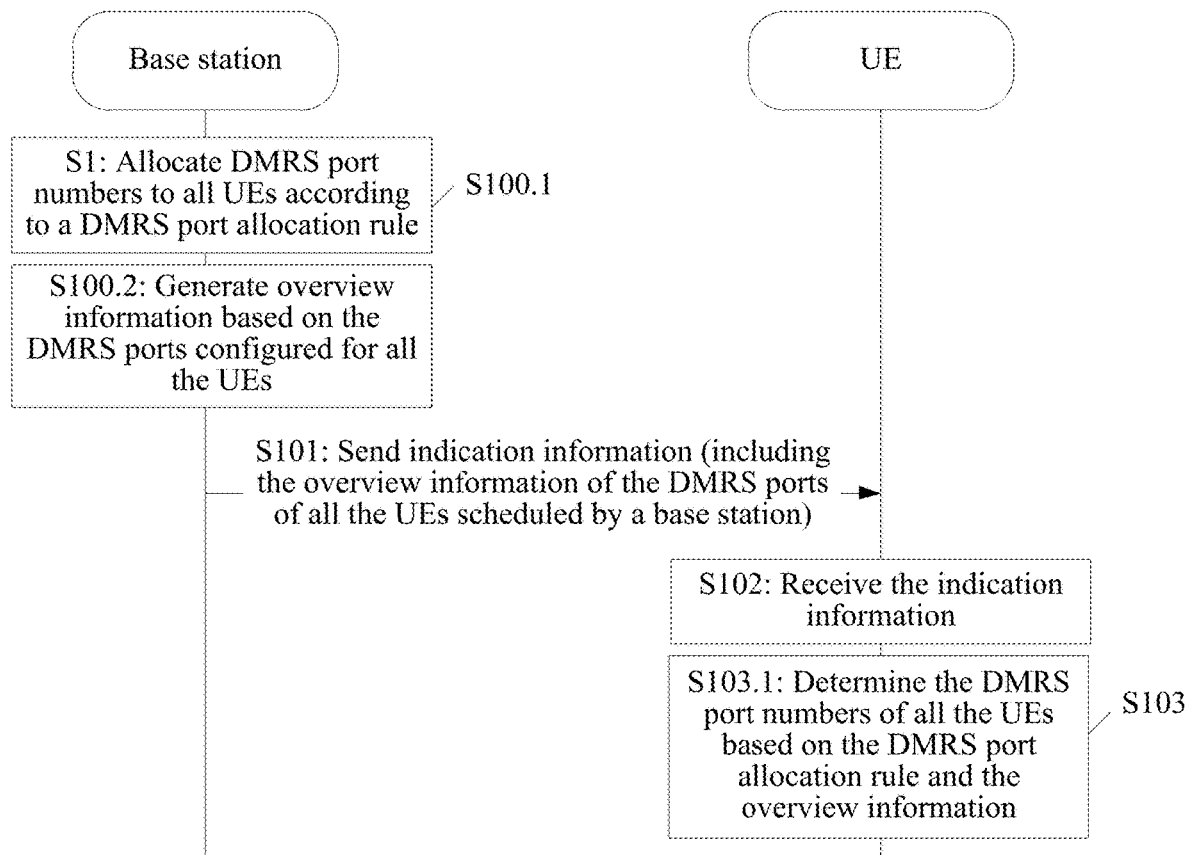
FIG. 12 is a schematic interaction diagram of another DMRS port configuration information obtaining method according to an embodiment of the present disclosure.

In this case, the overview information generated in step S100.2 may include at least one of the following information: the total quantity of transport layers of all the UEs, the total quantity of DMRS ports occupied by all the UEs, and the total quantity of DMRS ports not occupied by all the UEs. Step S103 may include step S103.1: The UE determines the DMRS port numbers of all the UEs based on the DMRS port allocation rule and the overview information, as shown in FIG. 12.

It is assumed that there is a following scenario in which a set including the preset DMRS port numbers is {#0, #1, #2, #3}, the total quantity of transport layers of all the UEs (specifically, three UEs) scheduled by the base station this time is 4, and quantities of transport layers of the three UEs (to be specific, UE 1, UE 2, and UE 3) are respectively 2, 1, and 2. The DMRS port allocation rule is the rule of continuously allocating DMRS port numbers in ascending order. The DMRS ports configured by the base station for all the UEs in Manner 1 may be shown in Table 7A.

TABLE 7A

| | UE identifier | | |
| --- | --- | --- | --- |
| | UE 1 | UE 2 | UE 3 |
| DMRS port number | #0 #1 | #2 | #3 |

Based on Table 7A, the overview information generated in step S100.2 may include the total quantity of DMRS ports occupied by all the UEs that is 4. In this case, in step S103, the DMRS port configuration information of all the UEs is shown in Table 7B. The DMRS port configuration information is determined by the UE according to the rule of continuously allocating DMRS port numbers in ascending order and the total quantity of DMRS ports occupied by all the UEs that is 4.

TABLE 7B

| DMRS port number | #0 | #1 | #2 | #3 |
| --- | --- | --- | --- | --- |

In some embodiments of this application, the base station may classify the DMRS ports of all the UEs into at least two DMRS port groups. Quasi co-locations (quasi co location, QCL) of DMRS ports in different DMRS port groups are different, to be specific, the DMRS ports are grouped based on QCLs. One DMRS port group may include one or more DMRS ports. If a DMRS port group includes a plurality of DMRS ports, QCLs of the plurality of DMRS ports are the same.

A scenario related to grouping of the DMRS ports may be, but not limited to: There may be a plurality of transmission/reception points (TRP) of one base station in some collaboration scenarios. Channel large-scale information of different TRPs may be different. Therefore, it may be considered that DMRS ports of different TRPs are non-QCL. Correspondingly, channel large-scale information of DMRS ports of a same TRP may be the same. Therefore, it may be considered that the DMRS ports of the same TRP are QCL. The large-scale information may be, but not limited to, at least one of the following information: delay spread, an average delay, Doppler spread, a Doppler frequency shift, an average gain, a terminal receive beam number, transmit/receive channel relevancy, a receiving angle of arrival, spatial correlation of a receiver antenna, and the like. For ease of description, in this application, it is assumed that DMRS ports of a same TRP are in a QCL DMRS port group, and DMRS ports of different TRPs are in non-QCL DMRS port groups. It should be noted that the grouping manner is merely an example rather than a limitation.

A DMRS port or DMRS ports may be classified into one DMRS port group through static configuration, semi-static configuration, or dynamic configuration. The static configuration and the semi-static configuration may be understood as that the base station pre-classifies usable DMRS ports into at least two DMRS port groups, and the terminal learns of grouping information in advance. Then, in an actual transmission process, the base station performs dynamic selection on the at least two DMRS port groups when invoking a DMRS port. For example, the static configuration may be, for example but not limited to, that the base station and the terminal agree upon at least two DMRS port groups in advance by using a protocol or the like. The semi-static configuration may be, for example but not limited to, that the base station notifies the UE of grouping information of at least two DMRS port groups by using Radio Resource Control (RRC) signaling, Media Access Control (MAC) signaling, and/or the like. The dynamic configuration may be understood as that the base station first determines an scheduled DMRS port of UE instead of grouping usable DMRS ports in advance, then groups the scheduled DMRS port, and next, configures grouping information for the UE by using, for example but not limited to, DCI. Descriptions are provided below by using examples.

(1) Group the DMRS ports through the static configuration or the semi-static configuration based on the QCLs.

In this case, the foregoing DMRS port configuration rule may be applicable to a QCL DMRS port group. To be specific, scheduled DMRS ports in a same DMRS port group still satisfy the foregoing DMRS port configuration rule, and no limitation is imposed on different DMRS port groups.

In this embodiment, the base station may configure overview information of each DMRS port group for the UE. The overview information of each DMRS port group includes at least one of the following information: a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

It is assumed that there is a following scenario in which a set including the preset DMRS port numbers is {#0, #1, #2, #3, #4, #5, #6, #7} and one base station is connected to two TRPs, a TRP 1 and a TRP 2. A relationship between UE served by each TRP and a corresponding DMRS port group may be shown in Table 8:

TABLE 8

| TRP | Served UE | Corresponding DMRS port group |
|---|---|---|
| TRP 1 | UE 1 and UE 2 | DMRS port group 1: {#0, #1, #2, #3} |
| TRP 2 | UE 2 and UE 3 | DMRS port group 2: {#4, #5, #6, #7} |

In a first example, it is assumed that a quantity of transport layers of the UE 1 is 1, a quantity of transport layers of the UE 2 is 2 and data streams of the two layers are from different TRPs, and a quantity of transport layers of the UE 3 is 2. If DMRS ports are allocated to each DMRS port group according to the rule of continuously allocating DMRS port numbers in ascending order, based on Table 8, the DMRS ports configured by the base station for all the UEs may be shown in Table 9:

TABLE 9

| | UE identifier | | | | |
|---|---|---|---|---|---|
| | UE 1 | UE 2 | | UE 3 | |
| DMRS port number | #0 | #1 | #4 | #5 | #6 |

In the example, the overview information may include overview information of a DMRS port group 1 and overview information of a DMRS port group 2. Details are as follows:

The overview information of the DMRS port group 1 may include a total quantity of DMRS ports (namely, #0 and #1 in Table 9) occupied by all UEs (namely, the UE 1 and the UE 2) corresponding to the DMRS port group 1 that is 2.

The overview information of the DMRS port group 2 may include a total quantity of DMRS ports (namely, #4, #5, and #6 in Table 9) occupied by all UEs (namely, the UE 2 and the UE 3) corresponding to the DMRS port group 2 that is 3.

It may be understood that in the example, the DMRS ports are orthogonal. Therefore, a total quantity of DMRS ports occupied by all UEs corresponding to a DMRS port group is a total quantity of transport layers of all the UEs. In addition, in this scenario, a scrambling code may not be involved.

In the example, the UE may learn, based on the total quantity of DMRS ports that is occupied by all the UEs corresponding to the DMRS port group 1 and that is 2, the DMRS port group 1 {#0, #1, #2, #3}, and the rule of continuously allocating DMRS ports in ascending order, that the DMRS ports occupied by all the UEs corresponding to the DMRS port group 1 are {#0, #1}. Similarly, the UE may learn that the DMRS ports occupied by all the UEs corresponding to the DMRS port group 2 are {#4, #5, #6}. Finally, each UE may learn of information about DMRS ports occupied or not occupied by all other UEs.

In a second example, it is assumed that a quantity of transport layers of the UE 1 is 3; a quantity of transport layers of the UE 2 is 4, two of the four layers of data streams are from a same TRP, and the other two layers of the data streams are from another TRP; and a quantity of transport layers of UE 3 is 3. If DMRS ports are allocated to each DMRS port group according to the rule of continuously allocating DMRS port numbers in ascending order, a set including the preset scrambling codes is {0, 1}, and the scrambling codes are allocated according to the rule of continuously allocating scrambling codes in ascending order, the DMRS ports configured by the base station for all the UEs may be shown in Table 10A:

TABLE 10A

| | UE identifier | | | | | | | | | |
|---|---|---|---|---|---|---|---|---|---|---|
| | UE 1 | | | UE 2 | | | | UE 3 | | |
| DMRS port number | #0 | #1 | #2 | #0 | #1 | #4 | #5 | #4 | #5 | #6 |
| Scrambling code | 0 | 0 | 0 | 1 | 1 | 0 | 0 | 1 | 1 | 1 |

Based on Table 10A, the overview information may include overview information of a DMRS port group 1 and overview information of a DMRS port group 2.

The overview information of the DMRS port group 1 may include a total quantity of DMRS ports (namely, #0, #1, and #2 in Table 10A) occupied by all UEs (namely, the UE 1 and the UE 2) corresponding to the DMRS port group 1 that is 3 and a total quantity of transport layers of all the UEs corresponding to the DMRS port group 1 that is 5.

The overview information of the DMRS port group 2 may include a total quantity of DMRS ports (namely, #4, #5, and #6 in Table 10A) occupied by all UEs (namely, the UE 2 and the UE 3) corresponding to the DMRS port group 2 that is 3 and a total quantity of transport layers of all the UEs corresponding to the DMRS port group 2 that is 5.

In the example, the UE may learn, based on the total quantity of DMRS ports that is occupied by all the UEs corresponding to the DMRS port group 1 and that is 3, the DMRS port group 1 {#0, #1, #2, #3}, and the rule of continuously allocating DMRS ports in ascending order, that the DMRS ports occupied by all the UEs corresponding to the DMRS port group 1 are {#0, #1, #2}. The UE may learn, based on the total quantity that is of transport layers of all the UEs corresponding to the DMRS port group 1 and that is 5, the rule that the quantity of DMRS ports corresponding to the previously allocated scrambling code is greater than or equal to the quantity of DMRS ports that corresponds to the subsequently allocated scrambling code, and the rule of continuously allocating scrambling code in ascending order, that DMRS ports corresponding to the scrambling code 0 are {#0, #1, #2} and DMRS ports corresponding to the scrambling code 1 are {#0, #1}, as shown in Table 10B. Similarly, each DMRS port that has been occupied in the DMRS port group 2 and a scrambling code corresponding to each DMRS port may be obtained, as shown in Table 10B.

TABLE 10B

| DMRS port number | #0 | #1 | #2 | #0 | #1 | #4 | #5 | #4 | #5 | #6 |
|---|---|---|---|---|---|---|---|---|---|---|
| Scrambling code | 0 | 0 | 0 | 1 | 1 | 0 | 0 | 1 | 1 | 1 |

Assuming that there is a following scenario in which DMRS ports in different DMRS port groups all overlap, in some embodiments of this application, different DMRS port groups may be distinguished by using scrambling codes. For example, a same scrambling code is configured for each DMRS port in each DMRS port group, and different scrambling codes are configured for the DMRS ports in different DMRS port groups. To be specific, DMRS ports in a same DMRS port group are orthogonal, and different DMRS port groups are semi-orthogonal. A scrambling code corresponding to each DMRS port group may be agreed upon by the base station and the UE in advance, or may be semi-statically configured or dynamically indicated. This is not limited in this application.

For example, a set of preset DMRS ports is {#0, #1, #2, #3}, one base station is connected to two TRPs, a TRP 1 and a TRP 2, and a relationship between UEs served by the TPR 1 and the TRP 2, DMRS port groups corresponding to the TRPs, and scrambling codes corresponding to the DMRS port groups is shown in Table 11:

TABLE 11

| TRP | Served UE | Corresponding DMRS port group | Scrambling code |
|---|---|---|---|
| TRP 1 | UE 1 and UE 2 | DMRS port group 1: {#0, #1, #2, #3} | 0 |
| TRP 2 | UE 2 and UE 3 | DMRS port group 2: {#0, #1, #2, #3} | 1 |

It is assumed that a quantity of transport layers of the UE 1 is 1, a quantity of transport layers of the UE 2 is 2 and data streams of the two transport layers are from different TRPs, and a quantity of transport layers of the UE 3 is 2. If DMRS ports are allocated to each DMRS port group according to the rule of continuously allocating DMRS port numbers in ascending order, based on Table 8, the DMRS ports configured by the base station for all the UEs may be shown in Table 12A:

TABLE 12A

| | UE identifier | | | | |
|---|---|---|---|---|---|
| | UE 1 | UE 2 | | UE 3 | |
| DMRS port number | #0 | #1 | #0 | #1 | #2 |
| Scrambling code | 0 | 0 | 1 | 1 | 1 |

In the example, the overview information may include overview information of a DMRS port group 1 and overview information of a DMRS port group 2. Details are as follows:

The overview information of the DMRS port group 1 may include a total quantity of DMRS ports (namely, #0 and #1 in Table 12A) occupied by all UEs (namely, the UE 1 and the UE 2) corresponding to the DMRS port group 1 that is 2.

The overview information of the DMRS port group 2 may include a total quantity of DMRS ports (namely, #0, #1, and #2 in Table 12A) occupied by all UEs (namely, the UE 2 and the UE 3) corresponding to the DMRS port group 2 that is 3.

In the example, the UE may learn based on the total quantity that is of DMRS ports occupied by all the UEs corresponding to the DMRS port group 1 and that is 2, the DMRS port group 1 {#0, #1, #2, #3}, and the rule of continuously allocating DMRS ports in ascending order, that the DMRS ports occupied by all the UEs corresponding to the DMRS port group 1 are {#0, #1}. In addition, a scrambling code corresponding to each DMRS port in the DMRS port group 1 is 0. Similarly, the DMRS ports occupied by all the UEs corresponding to the DMRS port group 2 and a scrambling code corresponding to each DMRS port may be learned, as shown in Table 12B.

TABLE 12B

| DMRS port number | #0 | #1 | #0 | #1 | #2 |
|---|---|---|---|---|---|
| Scrambling code | 0 | 0 | 1 | 1 | 1 |

(2) Group the DMRS ports through the dynamic configuration based on the QCLs.

In this case, the foregoing DMRS port configuration rule may cross non-QCL DMRS port groups. To be specific, scheduled DMRS ports in different DMRS port groups may still satisfy the foregoing DMRS port configuration rule. Certainly, scheduled DMRS ports in a same DMRS port group may also satisfy the foregoing DMRS port configuration rule. In this embodiment, the base station may classify corresponding DMRS ports into non-QCL DMRS port groups based on real-time scheduling. To be specific, a DMRS port group is dynamically configured based on quantities of scheduled layers in different DMRS port groups and the foregoing DMRS port configuration rule.

For example, a set including the preset DMRS port numbers is {#0, #1, #2, #3, #4, #5, #6, #7}, and one base station is connected to two TRPs, a TRP 1 and a TRP 2. UEs served by each TRP may be shown in Table 13:

TABLE 13

| TRP | Served UE |
| --- | --- |
| TRP 1 | UE 1 and UE 2 |
| TRP 2 | UE 2 and UE 3 |

If at a time point t1, quantities of scheduled transport layers of the UE 1, the UE 2, and the UE 3 are respectively 1, 2, and 1, and data streams of the two scheduled layers of the UE 2 are from different TRPs, assuming that the DMRS port rule is the rule of continuously allocating DMRS port numbers in ascending order, DMRS port numbers allocated by the base station to the three UEs are {#0, #1, #2, #3}, #0 and #1 are allocated to a DMRS port group 1, and #2 and #3 are allocated to a DMRS port group 2. In the dynamic configuration, a DMRS port group to which other ports #4, #5, #6, and #7 belong is not limited in this application.

If at a time point t2, quantities of scheduled transport layers of the UE 1, the UE 2, and the UE 3 are respectively 2, 2, and 1, and data streams of the two scheduled layers of the UE 2 are from different TRPs, assuming that the DMRS port rule is the rule of continuously allocating DMRS port numbers in ascending order, DMRS port numbers allocated by the base station to the three UEs are {#0, #1, #2, #3, #4}, #0, #1, and #2 are allocated to the DMRS port group 1, and #3 and #4 are allocated to the DMRS port group 2. In the dynamic configuration, a DMRS port group to which other ports #5, #6, and #7 belong is not limited in this application.

In conclusion, it may be learned that at the time point t1, the base station allocates #2 to the TRP 1, and uses #2 as one of DMRS ports used by the TRP 1 for data transmission. At the time point t2, the base station allocates #2 to the TRP 2, and uses #2 as one of DMRS ports used by the TRP 2 for data transmission. In other words, the base station may dynamically configure a belonging relationship between any DMRS port and any DMRS port group. However, actually configured DMRS port numbers of all DMRS port groups may still comply with the DMRS port allocation rule.

The solutions provided in the embodiments of the present disclosure are described above mainly from the perspective of interaction between network elements. It may be understood that to achieve the foregoing functions, the network elements such as the UE and the base station include corresponding hardware structures and/or software modules for performing the functions. A person of ordinary skill in the art should easily be aware that, in combination with the examples of the units, algorithms, and steps described in the embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, functional module division may be performed on the UE, the base station, and the like according to the examples of the methods. For example, various functional modules may be obtained through division according to the corresponding functions, or two or more functions may be integrated into one processing module. The integrated module may be implemented in a form of hardware, or may be implemented in a form of a software functional module. It should be noted that the module division in the embodiments of the present disclosure is an example, and is merely logical function division. There may be other division manners in an actual implementation.

Figure 13:
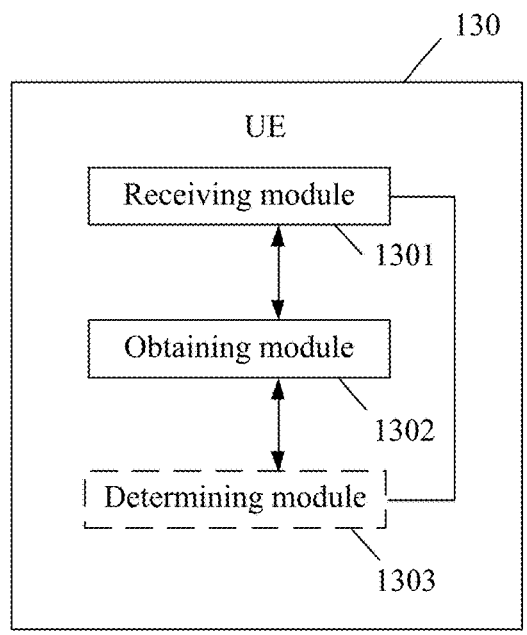
FIG. 13 is a schematic structural diagram of UE according to an embodiment of the present disclosure.

When the functional modules are obtained through division according to the corresponding functions, FIG. 13 is a possible schematic structural diagram of UE 130 in the foregoing embodiments. The UE 130 includes a receiving module 1301 and an obtaining module 1302. Optionally, the UE 130 may further include a determining module 1303. For a function of each of the functional modules, the function may be derived based on the steps in each of the foregoing method embodiments; or refer to the content provided in the summary part, and details are not described herein again.

When the integrated module is used, the obtaining module 1302 and the determining module 1303 may be integrated into a processing module in the UE. In addition, the UE may further include a sending module and a storage module. The receiving module 1301 and the sending module may be integrated into a communications module in the UE.

Figure 14:
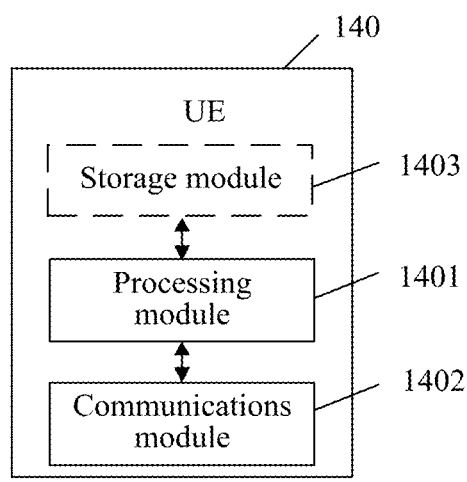
FIG. 14 is a schematic structural diagram of another UE according to an embodiment of the present disclosure.

FIG. 14 is a schematic structural diagram of UE 140 according to an embodiment of the present disclosure. The UE 140 may include a processing module 1401 and a communications module 1402. The processing module 1401 is configured to perform control management on actions of the UE 140. For example, the processing module 1401 is configured to support the UE 140 in performing step S102 and step S103 in FIG. 3, FIG. 5, FIG. 9, and FIG. 12 and/or another process in a technology described in this application. The receiving module 1401 is configured to support communication between the UE 140 and another network entity, for example, communication with a base station. Optionally, the UE 140 may further include a storage module 1403, configured to store program code and data that correspond to any one of the foregoing DMRS port configuration information obtaining methods performed by the UE 140.

The processing module 1401 may be a processor or a controller. The communications module 1402 may be a transceiver, a transceiver circuit, a communications interface, or the like. The storage module 1403 may be a memory.

Figure 15:
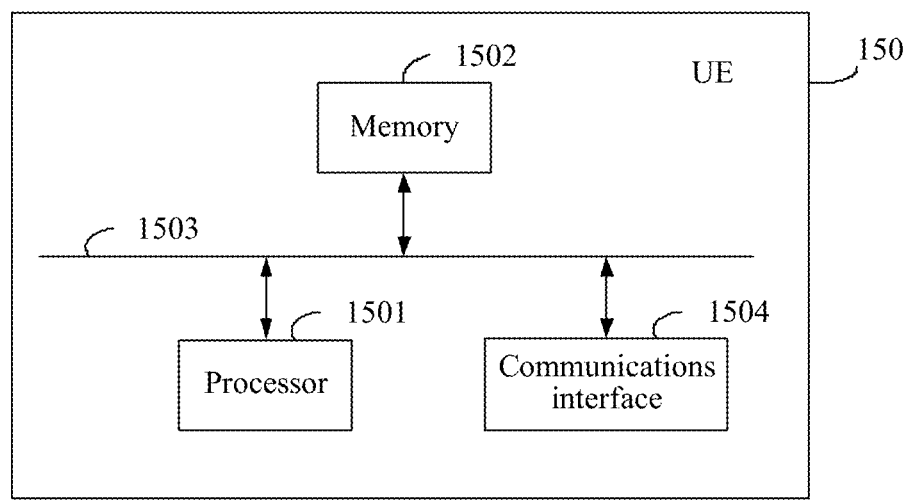
FIG. 15 is a schematic structural diagram of another UE according to an embodiment of the present disclosure.

When the processing module 1401 is a processor, the communications module 1402 is a transceiver, and the storage module 1403 is a memory, the UE 140 in this embodiment of the present disclosure may be shown in FIG. 15.

FIG. 15 is a schematic structural diagram of UE 150 according to an embodiment of the present disclosure. The UE 150 includes a processor 1501, a memory 1502, a system bus 1503, and a communications interface 1504. The processor 1501, the memory 1502, and the communications interface 1504 are connected by using the system bus 1503.

The memory 1502 is configured to store a computer-executable instruction. When the UE 150 runs, the processor 1501 executes the computer-executable instruction stored in the memory 1502, to enable the UE 150 to perform any DMRS port configuration information obtaining method provided in the embodiments of the present disclosure. For a specific DMRS port configuration information obtaining method, refer to related descriptions below and in the accompanying drawings, and details are not described herein again.

An embodiment of the present disclosure further provides a storage medium. The storage medium may include a memory 1502.

The processor 1501 may be a processor, or may be a general term of a plurality of processing elements. For example, the processor 1501 may be a central processing unit (CPU), a general-purpose processor, a digital signal processor (DSP), an application-specific integrated circuit (ASIC), a field programmable gate array (FPGA), another programmable logic device, a transistor logic device, a hardware component, or any combination thereof. The processor 1501 may implement or execute various examples of logical blocks, modules, and circuits described with reference to the content disclosed in the present disclosure. The general-purpose processor may be a microprocessor. Alternatively, the processor may be any conventional processor or the like. The processor 1501 may alternatively be a dedicated processor. The dedicated processor may include at least one of a baseband processing chip, a radio frequency processing chip, and the like. Further, the dedicated processor may further include a chip having another dedicated processing function of the UE 150.

The memory 1502 may include a volatile memory (volatile memory), for example, a random-access memory (RAM). The memory 1502 may alternatively include a non-volatile memory, for example, a read-only memory (ROM), a flash memory, a hard disk drive (HDD), or a solid-state drive (SSD). The memory 1502 may alternatively include a combination of the foregoing types of memories.

The system bus 1503 may include a data bus, a power bus, a control bus, a signal status bus, and the like. In this embodiment, for a purpose of clear description, all buses are marked as the system bus 1503 in FIG. 15.

The communications interface 1504 may be specifically a transceiver on the UE 150. The transceiver may be a wireless transceiver. For example, the wireless transceiver may be an antenna or the like of the UE 150. The processor 1501 receives data from or sends data to another device, for example, a base station by using the communications interface 1504.

In a specific implementation process, each step in the procedure of any DMRS port configuration information obtaining method provided above in the specification may be implemented by the processor 1501 in a hardware form executing the computer-executable instruction in a software form that is stored in the memory 1502. To avoid repetition, details are not described herein again.

Figure 16:
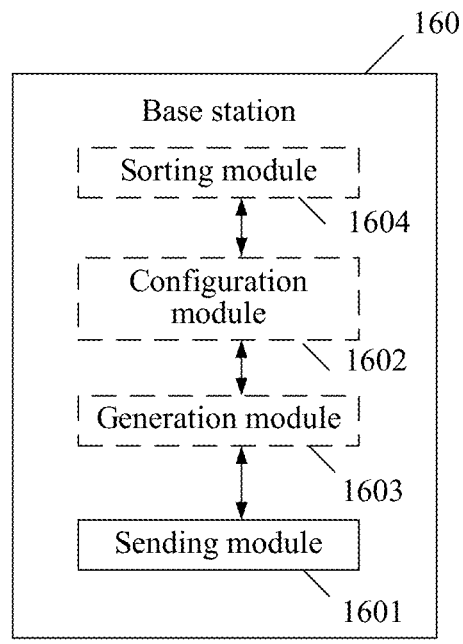
FIG. 16 is a schematic structural diagram of a base station according to an embodiment of the present disclosure.

When the functional modules are obtained through division according to the corresponding functions, FIG. 16 is a possible schematic structural diagram of a base station 160 in the foregoing embodiments. The base station 160 includes a sending module 1601. Optionally, the base station 160 may further include a configuration module 1602, a generation module 1603, and a sorting module 1604. For a function of each of the functional modules, the function may be derived based on the steps in each of the foregoing method embodiments; or refer to the content provided in the summary part, and details are not described herein again.

When an integrated module is used, the configuration module 1602, the generation module 1603, and the sorting module 1604 may be integrated into a processing module in the base station. In addition, the base station may further include a receiving module and a storage module. The sending module 1601 and the receiving module may be integrated into a communications module in the base station.

Figure 17:
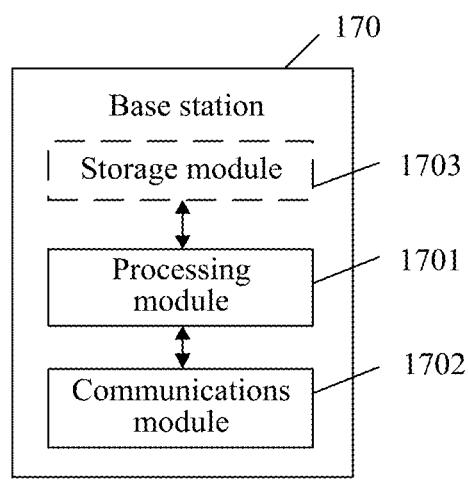
FIG. 17 is a schematic structural diagram of another base station according to an embodiment of the present disclosure.

FIG. 17 is a schematic diagram of a base station 170 according to an embodiment of the present disclosure. The base station 170 may include a processing module 1701 and a communications module 1702. The processing module 1701 is configured to perform control management on actions of the base station 170. For example, the processing module 1701 is configured to support the base station 170 in performing step S101 in FIG. 3, step S100.1 to step S101 in FIG. 5 to FIG. 7, step S100.0 to step S101 in FIG. 8, step S101 in FIG. 9, step S100.1 to step S101 in FIG. 12 and/or another process in a technology described in this application. The receiving module 1702 is configured to support communication between the base station 170 and another network entity, for example, communication with UE. Optionally, the base station 170 may further include a storage module 1703, configured to store program code and data that correspond to any one of the foregoing DMRS port configuration information delivery methods performed by the base station 170.

The processing module 1701 may be a processor or a controller. The communications module 1702 may be a transceiver, a transceiver circuit, a communications interface, or the like. The storage module 1703 may be a memory.

Figure 18:
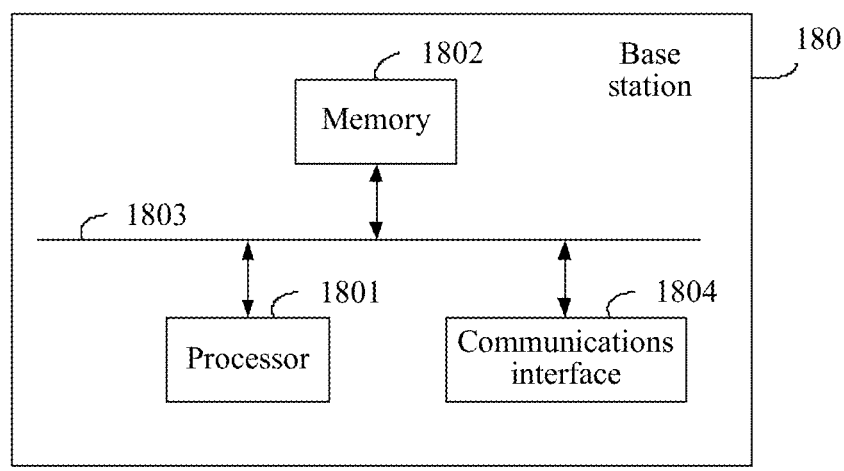
FIG. 18 is a schematic structural diagram of another base station according to an embodiment of the present disclosure.

When the processing module 1701 is a processor, the receiving module 1702 is a transceiver, and the storage module 1703 is a memory, the base station 170 in this embodiment of the present disclosure may be shown in FIG. 18.

FIG. 18 is a schematic diagram of a base station 180 according to an embodiment of the present disclosure. The base station 180 includes a processor 1801, a memory 1802, a system bus 1803, and a communications interface 1804. The processor 1801, the memory 1802, and the communications interface 1804 are connected by using the system bus 1803. The memory 1802 is configured to store a computer-executable instruction. When the base station 180 runs, the processor 1801 executes the computer-executable instruction stored in the memory 1802, to enable the base station 180 to perform any one of the DMRS port configuration information delivery methods provided in the embodiments of the present disclosure. For a specific DMRS port configuration information delivery method, refer to related descriptions below and in the accompanying drawings, and details are not described herein again.

An embodiment of the present disclosure further provides a storage medium. The storage medium may include a memory 1802. The processor 1801 may be a processor, or may be a general term of a plurality of processing elements. For example, the processor 1801 may be a CPU. The processor 1801 may alternatively be another general-purpose processor, a DSP, an ASIC, an FPGA, another programmable logic device, a discrete gate, a transistor logic device, a discrete hardware component, or the like. The general-purpose processor may be a microprocessor. Alternatively, the processor may be any conventional processor or the like. The processor 1801 may alternatively be a dedicated processor. The dedicated processor may include at least one of a baseband processing chip, a radio frequency processing chip, and the like. Further, the dedicated processor may further include a chip having another dedicated processing function of the base station 180.

The memory 1802 may include a volatile memory, for example, a RAM. Alternatively, the memory 1802 may include a non-volatile memory, for example, a ROM, a flash memory, an HDD, or an SSD. Alternatively, the memory 1802 may include a combination of the foregoing types of memories.

The system bus 1803 may include a data bus, a power bus, a control bus, a signal status bus, and the like. In this embodiment, for a purpose of clear description, all buses are marked as the system bus 1803 in FIG. 18.

The communications interface 1804 may be specifically a transceiver of the base station 180. The transceiver may be a wireless transceiver. For example, the wireless transceiver may be an antenna or the like of the base station 180. The processor 1801 receives data from or sends data to another device, for example, UE by using the communications interface 1804.

In a specific implementation process, each step in the procedure of any DMRS port configuration information delivery method provided above may be implemented by the processor 1801 in a hardware form executing the computer-executable instruction in a software form that is stored in the memory 1802. To avoid repetition, details are not described herein again.

Further embodiments of the present disclosure are provided in the following. It should be noted that the numbering used in the following section does not necessarily need to comply with the numbering used in the previous sections.

1. A demodulation reference signal DMRS port configuration information obtaining method, comprising:
receiving, by user equipment UE, indication information sent by a base station, wherein the indication information comprises overview information of DMRS ports of all UEs scheduled by the base station; and
obtaining, by the UE, DMRS port configuration information of all the UEs according to a preset rule and the indication information.

2. The method according to embodiment 1, wherein the overview information comprises at least one of the following information: a total quantity of transport layers of all the UEs, a total quantity of DMRS ports occupied by all the UEs, and a total quantity of DMRS ports not occupied by all the UEs.

3. The method according to embodiment 1 or 2, wherein the preset rule comprises a DMRS port allocation rule.

4. The method according to embodiment 3, wherein the DMRS port allocation rule comprises any one of the following information: a rule of continuously allocating DMRS port numbers in ascending order, a rule of continuously allocating DMRS port numbers in descending order, a rule of allocating DMRS port numbers in ascending order of first odd and then even numbers or first even and then odd numbers, and a rule of allocating DMRS port numbers in descending order of first odd and then even numbers or first even and then odd numbers.

5. The method according to embodiment 3 or 4, wherein the preset rule further comprises a scrambling code allocation rule.

6. The method according to embodiment 5, wherein the scrambling code allocation rule comprises any one of the following information: a rule of continuously allocating scrambling codes in ascending order, a rule of continuously allocating scrambling codes in descending order, a rule of allocating scrambling codes in ascending order of first odd and then even numbers or first even and then odd numbers, and a rule of allocating scrambling codes in descending order of first odd and then even numbers or first even and then odd numbers.

7. The method according to embodiment 5 or 6, wherein the preset rule further comprises: a rule that a quantity of DMRS ports corresponding to a previously allocated scrambling code is greater than or equal to a quantity of DMRS ports corresponding to a subsequently allocated scrambling code, or a rule that a quantity of DMRS ports corresponding to a subsequently allocated scrambling code is greater than or equal to a quantity of DMRS ports corresponding to a previously allocated scrambling code.

8. The method according to embodiment 6 or 7, wherein the obtaining, by the UE, DMRS port configuration information of all the UEs according to a preset rule and the indication information comprises:
obtaining, by the UE, scrambling codes according to the scrambling code allocation rule, and obtaining the DMRS port configuration information of all the UEs based on the DMRS port allocation rule and the overview information when a same scrambling code is used; or
obtaining, by the UE, DMRS port numbers of all the UEs based on the DMRS port allocation rule and the overview information, and when DMRS port numbers of different UEs are multiplexed, allocating a scrambling code to each multiplexed DMRS port number according to the scrambling code allocation rule.

9. The method according to any one of embodiments 1 to 8, wherein the indication information further comprises information used to determine DMRS port configuration information of the UE, and the method further comprises:
determining, by the UE, the DMRS port configuration information of the UE based on the information used to determine the DMRS port configuration information of the UE and the preset rule.

10. The method according to embodiment 9, wherein the information used to determine the DMRS port configuration information of the UE comprises: a maximum DMRS port number allocated to the UE and a quantity of transport layers of the UE, or a minimum DMRS port number allocated to the UE and a quantity of transport layers of the UE.

11. The method according to embodiment 10, wherein the information used to determine the DMRS port configuration information of the UE further comprises a scrambling code identifier allocated to the UE.

12. The method according to embodiment 2, wherein the DMRS ports of all the UEs are classified into at least two DMRS port groups, quasi co-locations QCLs of DMRS ports in different DMRS port groups are different, the overview information comprises overview information of each DMRS port group, and overview information of a DMRS port group comprises at least one of the following information: a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

13. The method according to embodiment 4, wherein the DMRS ports of all the UEs are classified into at least two DMRS port groups, quasi co-locations QCLs of DMRS ports in different DMRS port groups are different, and the DMRS port allocation rule is a DMRS port allocation rule of any one of the at least two DMRS port groups.

14. A demodulation reference signal DMRS port configuration information delivery method, comprising:

sending, by a base station, indication information to user equipment UE, to instruct the UE to obtain, according to a preset rule and the indication information, DMRS port configuration information of all UEs scheduled by the base station, wherein the indication information comprises overview information of DMRS ports of all the UEs.

15. The method according to embodiment 14, wherein the overview information comprises at least one of the following information: a total quantity of transport layers of all the UEs, a total quantity of DMRS ports occupied by all the UEs, and a total quantity of DMRS ports not occupied by all the UEs.

16. The method according to embodiment 14 or 15, wherein before the sending, by a base station, indication information to user equipment UE, the method further comprises:
configuring, by the base station, the DMRS ports for all the UEs according to the preset rule; and
generating, by the base station, the overview information based on the DMRS ports configured for all the UEs.

17. The method according to embodiment 16, wherein the preset rule comprises a DMRS port allocation rule, and the configuring, by the base station, the DMRS ports for all the UEs according to the preset rule comprises:
allocating, by the base station, DMRS port numbers to all the UEs according to the DMRS port allocation rule.

18. The method according to embodiment 17, wherein the DMRS port allocation rule comprises any one of the following information: a rule of continuously allocating DMRS port numbers in ascending order, a rule of continuously allocating DMRS port numbers in descending order, a rule of allocating DMRS port numbers in ascending order of first odd and then even numbers or first even and then odd numbers, and a rule of allocating DMRS port numbers in descending order of first odd and then even numbers or first even and then odd numbers.

19. The method according to embodiment 17 or 18, wherein the preset rule further comprises a scrambling code allocation rule, and the configuring, by the base station, the DMRS ports for all the UEs according to the preset rule further comprises:
allocating, by the base station to all the UEs according to the scrambling code allocation rule, scrambling codes corresponding to the DMRS port numbers.

20. The method according to embodiment 19, wherein the scrambling code allocation rule comprises any one of the following information: a rule of continuously allocating scrambling codes in ascending order, a rule of continuously allocating scrambling codes in descending order, a rule of allocating scrambling codes in ascending order of first odd and then even numbers or first even and then odd numbers, and a rule of allocating scrambling codes in descending order of first odd and then even numbers or first even and then odd numbers.

21. The method according to embodiment 19 or 20, wherein the preset rule further comprises: a rule that a quantity of DMRS ports corresponding to a previously allocated scrambling code is greater than or equal to a quantity of DMRS ports corresponding to a subsequently allocated scrambling code, or a rule that a quantity of DMRS ports corresponding to a subsequently allocated scrambling code is greater than or equal to a quantity of DMRS ports corresponding to a previously allocated scrambling code.

22. The method according to any one of embodiments 19 to 21, wherein the allocating, by the base station, DMRS port numbers to all the UEs according to the DMRS port allocation rule and the allocating, by the base station to all the UEs according to the scrambling code allocation rule, scrambling codes corresponding to the DMRS port numbers comprise:
allocating, by the base station, the scrambling codes according to the scrambling code allocation rule, and allocating the DMRS port numbers to all the UEs based on the DMRS port allocation rule and a quantity of transport layers of each of all the UEs when a same scrambling code is used; or
allocating, by the base station, a DMRS port number to each UE based on the DMRS port allocation rule and a quantity of transport layers of each of all the UEs, and when DMRS port numbers of different UEs are multiplexed, allocating a scrambling code to each multiplexed DMRS port number according to the scrambling code allocation rule.

23. The method according to embodiment 22, wherein before the allocating, by the base station, the scrambling codes according to the scrambling code allocation rule, and allocating the DMRS port numbers to all the UEs based on the DMRS port allocation rule and a quantity of transport layers of each of all the UEs when a same scrambling code is used, the method further comprises:
sorting, by the base station, all the UEs, to obtain at least two sequences; and
selecting a first sequence from the at least two sequences according to an orthogonal priority rule, wherein the orthogonal priority rule is a rule that the quantity of DMRS ports corresponding to the previously allocated scrambling code accounts for a maximum proportion of the total quantity of DMRS ports allocated to all the UEs, or a rule that the quantity of DMRS ports corresponding to the subsequently allocated scrambling code accounts for a maximum proportion of the total quantity of DMRS ports allocated to all the UEs; and
the allocating, by the base station, the scrambling codes according to the scrambling code allocation rule, and allocating the DMRS port numbers to all the UEs based on the DMRS port allocation rule and a quantity of transport layers of each of all the UEs when a same scrambling code is used comprises:
allocating, by the base station, the scrambling codes according to the scrambling code allocation rule, and sequentially allocating a DMRS port number to each of UEs in the first sequence based on the DMRS port allocation rule and the quantity of transport layers of each of all the UEs when the same scrambling code is used.

24. The method according to any one of embodiments 14 to 23, wherein the indication information further comprises information used to determine DMRS port configuration information of the UE.

25. The method according to embodiment 24, wherein the information used to determine the DMRS port configuration information of the UE comprises: a maximum DMRS port number allocated to the UE and a quantity of transport layers of the UE, or a minimum DMRS port number allocated to the UE and a quantity of transport layers of the UE.

26. The method according to embodiment 25, wherein the information used to determine the DMRS port configuration information of the UE further comprises a scrambling code identifier allocated to the UE.

27. The method according to embodiment 15, wherein the DMRS ports of all the UEs are classified into at least two DMRS port groups, quasi co-locations QCLs of DMRS ports in different DMRS port groups are different, the overview information comprises overview information of each DMRS port group, and overview information of a DMRS port group comprises at least one of the following information: a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

28. The method according to embodiment 18, wherein the DMRS ports of all the UEs are classified into at least two DMRS port groups, quasi co-locations QCLs of DMRS ports in different DMRS port groups are different, and the DMRS port allocation rule is a DMRS port allocation rule of any one of the at least two DMRS port groups.

29. User equipment UE, comprising:
a receiving module, configured to receive indication information sent by a base station, wherein the indication information comprises overview information of DMRS ports of all UEs scheduled by the base station; and
an obtaining module, configured to obtain DMRS port configuration information of all the UEs according to a preset rule and the indication information.

30. The UE according to embodiment 29, wherein the overview information comprises at least one of the following information: a total quantity of transport layers of all the UEs, a total quantity of DMRS ports occupied by all the UEs, and a total quantity of DMRS ports not occupied by all the UEs.

31. The UE according to embodiment 29 or 30, wherein the preset rule comprises a DMRS port allocation rule.

32. The UE according to embodiment 31, wherein the DMRS port allocation rule comprises any one of the following information: a rule of continuously allocating DMRS port numbers in ascending order, a rule of continuously allocating DMRS port numbers in descending order, a rule of allocating DMRS port numbers in ascending order of first odd and then even numbers or first even and then odd numbers, and a rule of allocating DMRS port numbers in descending order of first odd and then even numbers or first even and then odd numbers.

33. The UE according to embodiment 31 or 32, wherein the preset rule further comprises a scrambling code allocation rule.

34. The UE according to embodiment 33, wherein the scrambling code allocation rule comprises any one of the following information: a rule of continuously allocating scrambling codes in ascending order, a rule of continuously allocating scrambling codes in descending order, a rule of allocating scrambling codes in ascending order of first odd and then even numbers or first even and then odd numbers, and a rule of allocating scrambling codes in descending order of first odd and then even numbers or first even and then odd numbers.

35. The UE according to embodiment 33 or 34, wherein the preset rule further comprises: a rule that a quantity of DMRS ports corresponding to a previously allocated scrambling code is greater than or equal to a quantity of DMRS ports corresponding to a subsequently allocated scrambling code, or a rule that a quantity of DMRS ports corresponding to a subsequently allocated scrambling code is greater than or equal to a quantity of DMRS ports corresponding to a previously allocated scrambling code.

36. The UE according to embodiment 34 or 35, wherein the obtaining module is specifically configured to:
obtain scrambling codes according to the scrambling code allocation rule, and obtain the DMRS port configuration information of all the UEs based on the DMRS port allocation rule and the overview information when a same scrambling code is used; or
obtain DMRS port numbers of all the UEs based on the DMRS port allocation rule and the overview information, and when DMRS port numbers of different UEs are multiplexed, allocate a scrambling code to each multiplexed DMRS port number according to the scrambling code allocation rule.

37. The UE according to any one of embodiments 29 to 36, wherein the indication information further comprises information used to determine DMRS port configuration information of the UE, and the UE further comprises:
a determining module, configured to determine the DMRS port configuration information of the UE based on the information used to determine the DMRS port configuration information of the UE and the preset rule.

38. The UE according to embodiment 37, wherein the information used to determine the DMRS port configuration information of the UE comprises: a maximum DMRS port number allocated to the UE and a quantity of transport layers of the UE, or a minimum DMRS port number allocated to the UE and a quantity of transport layers of the UE.

39. The UE according to embodiment 38, wherein the information used to determine the DMRS port configuration information of the UE further comprises a scrambling code identifier allocated to the UE.

40. The UE according to embodiment 30, wherein the DMRS ports of all the UEs are classified into at least two DMRS port groups, and quasi co-locations QCLs of DMRS ports in different DMRS port groups are different, the overview information comprises overview information of each DMRS port group, and overview information of a DMRS port group comprises at least one of the following information: a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

41. The UE according to embodiment 32, wherein the DMRS ports of all the UEs are classified into at least two DMRS port groups, quasi co-locations QCLs of DMRS ports in different DMRS port groups are different, and the DMRS port allocation rule is a DMRS port allocation rule of any one of the at least two DMRS port groups.

42. A base station, comprising:
a sending module, configured to send indication information to user equipment UE, to instruct the UE to obtain, according to a preset rule and the indication information, DMRS port configuration information of all UEs scheduled by the base station, wherein the indication information comprises overview information of DMRS ports of all the UEs.

43. The base station according to embodiment 42, wherein the overview information comprises at least one of the following information: a total quantity of transport layers of all the UEs, a total quantity of DMRS ports occupied by all the UEs, and a total quantity of DMRS ports not occupied by all the UEs.

44. The base station according to embodiment 42 or 43, wherein the base station further comprises:
a configuration module, configured to configure the DMRS ports for all the UEs according to the preset rule; and
a generation module, configured to generate the overview information based on the DMRS ports configured for all the UEs.

45. The base station according to embodiment 44, wherein the preset rule comprises a DMRS port allocation rule, and the configuration module is specifically configured to allocate DMRS port numbers to all the UEs according to the DMRS port allocation rule.

46. The base station according to embodiment 45, wherein the DMRS port allocation rule comprises any one of the following information: a rule of continuously allocating DMRS port numbers in ascending order, a rule of continuously allocating DMRS port numbers in descending order, a rule of allocating DMRS port numbers in ascending order of first odd and then even numbers or first even and then odd numbers, and a rule of allocating DMRS port numbers in descending order of first odd and then even numbers or first even and then odd numbers.

47. The base station according to embodiment 45 or 46, wherein the preset rule further comprises a scrambling code allocation rule, and the configuration module is further configured to:

allocate, to all the UEs according to the scrambling code allocation rule, scrambling codes corresponding to the DMRS port numbers.

48. The base station according to embodiment 47, wherein the scrambling code allocation rule comprises any one of the following information: a rule of continuously allocating scrambling codes in ascending order, a rule of continuously allocating scrambling codes in descending order, a rule of allocating scrambling codes in ascending order of first odd and then even numbers or first even and then odd numbers, and a rule of allocating scrambling codes in descending order of first odd and then even numbers or first even and then odd numbers.

49. The base station according to embodiment 47 or 48, wherein the preset rule further comprises: a rule that a quantity of DMRS ports corresponding to a previously allocated scrambling code is greater than or equal to a quantity of DMRS ports corresponding to a subsequently allocated scrambling code, or a rule that a quantity of DMRS ports corresponding to a subsequently allocated scrambling code is greater than or equal to a quantity of DMRS ports corresponding to a previously allocated scrambling code.

50. The base station according to any one of embodiments 47 to 49, wherein the configuration module is specifically configured to:

allocate the scrambling codes according to the scrambling code allocation rule, and allocate the DMRS port numbers to all the UEs based on the DMRS port allocation rule and a quantity of transport layers of each of all the UEs when a same scrambling code is used; or allocate a DMRS port number to each UE based on the DMRS port allocation rule and a quantity of transport layers of each of all the UEs, and when DMRS port numbers of different UEs are multiplexed, allocate a scrambling code to each multiplexed DMRS port number according to the scrambling code allocation rule.

51. The base station according to embodiment 50, wherein the base station further comprises:

a sorting module, configured to sort all the UEs, to obtain at least two sequences; and a selection module, configured to select a first sequence from the at least two sequences according to an orthogonal priority rule, wherein the orthogonal priority rule is a rule that the quantity of DMRS ports corresponding to the previously allocated scrambling code accounts for a maximum proportion of the total quantity of DMRS ports allocated to all the UEs or a rule that the quantity of DMRS ports corresponding to the subsequently allocated scrambling code accounts for a maximum proportion of the total quantity of DMRS ports allocated to all the UEs; and the configuration module is specifically configured to allocate the scrambling codes according to the scrambling code allocation rule, and sequentially allocate a DMRS port number to each of UEs in the first sequence based on the DMRS port allocation rule and the quantity of transport layers of each of all the UEs when the same scrambling code is used.

52. The base station according to any one of embodiments 42 to 51, wherein the indication information further comprises information used to determine DMRS port configuration information of the UE.

53. The base station according to embodiment 52, wherein the information used to determine the DMRS port configuration information of the UE comprises: a maximum DMRS port number allocated to the UE and a quantity of transport layers of the UE, or a minimum DMRS port number allocated to the UE and a quantity of transport layers of the UE.

54. The base station according to embodiment 53, wherein the information used to determine the DMRS port configuration information of the UE further comprises a scrambling code identifier allocated to the UE.

55. The base station according to embodiment 43, wherein the DMRS ports of all the UEs are classified into at least two DMRS port groups, and quasi co-locations QCLs of DMRS ports in different DMRS port groups are different, the overview information comprises overview information of each DMRS port group, and overview information of a DMRS port group comprises at least one of the following information: a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

56. The base station according to embodiment 46, wherein the DMRS ports of all the UEs are classified into at least two DMRS port groups, quasi co-locations QCLs of DMRS ports in different DMRS port groups are different, and the DMRS port allocation rule is a DMRS port allocation rule of any one of the at least two DMRS port groups.

A person skilled in the art should be aware that in the foregoing one or more examples, functions described in the present disclosure may be implemented by hardware, software, firmware, or any combination thereof. When the present disclosure is implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A demodulation reference signal (DMRS) port configuration information delivery method, comprising:
   sending, by a base station, indication information to user equipment (UE) for instructing the UE to obtain, according to a preset rule and the indication information, DMRS port configuration information of all UEs scheduled by the base station, wherein the indication information comprises overview information of DMRS ports of all the UEs and a scrambling code identifier allocated to the UE, wherein the preset rule includes:
   a rule indicating that a quantity of DMRS ports corresponding to a previously allocated scrambling code by the base station is greater than or equal to a quantity of DMRS ports corresponding to a subsequently allocated scrambling code by the base station, or
   a rule indicating that a quantity of DMRS ports corresponding to a subsequently allocated scrambling code by the base station is greater than or equal to a quantity of DMRS ports corresponding to a previously allocated scrambling code by the base station.

2. The method according to claim 1, wherein the overview information comprises at least one of the following information: a total quantity of transport layers of all the UEs, a total quantity of DMRS ports occupied by all the UEs, and a total quantity of DMRS ports not occupied by all the UEs.

3. The method according to claim 1, wherein the indication information further comprises first information for determining DMRS port configuration information of the UE, and wherein the first information comprises: a maximum DMRS port number allocated to the UE and a quantity of transport layers of the UE, or a minimum DMRS port number allocated to the UE and a quantity of transport layers of the UE.

4. The method according to claim 2, wherein:
   the DMRS ports of all the UEs are classified into at least two DMRS port groups;
   quasi co-locations (QCLs) of DMRS ports in different DMRS port groups are different; and
   the overview information comprises overview information of each DMRS port group comprising at least one of the following information:
      a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

5. User equipment (UE), comprising:
   a transceiver configured to receive indication information sent by a base station, wherein the indication information comprises overview information of DMRS ports of all UEs scheduled by the base station; and
   a processor configured to obtain DMRS port configuration information of all the UEs according to a preset rule and the indication information, wherein the indication information comprises overview information of DMRS ports of all the UEs and a scrambling code identifier allocated to the UE, wherein the preset rule includes:
   a rule indicating that a quantity of DMRS ports corresponding to a previously allocated scrambling code by the base station is greater than or equal to a quantity of DMRS ports corresponding to a subsequently allocated scrambling code by the base station, or
   a rule indicating that a quantity of DMRS ports corresponding to a subsequently allocated scrambling code by the base station is greater than or equal to a quantity of DMRS ports corresponding to a previously allocated scrambling code by the base station.

6. The UE according to claim 5, wherein the overview information comprises at least one of the following information: a total quantity of transport layers of all the UEs, a total quantity of DMRS ports occupied by all the UEs, and a total quantity of DMRS ports not occupied by all the UEs.

7. The UE according to claim 5, wherein the indication information further comprises first information used to determine DMRS port configuration information of the UE, and wherein the first information comprises: a maximum DMRS port number allocated to the UE and a quantity of transport layers of the UE, or a minimum DMRS port number allocated to the UE and a quantity of transport layers of the UE.

8. The UE according to claim 6, wherein:
   the DMRS ports of all the UEs are classified into at least two DMRS port groups;
   quasi co-locations (QCLs) of DMRS ports in different DMRS port groups are different; and
   the overview information comprises overview information of each DMRS port group comprising at least one of the following information:
      a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

9. A base station, comprising:
   a transceiver configured to send indication information to user equipment (UE) for instructing the UE to obtain, according to a preset rule and the indication information, DMRS port configuration information of all UEs scheduled by the base station, wherein the indication information comprises overview information of DMRS ports of all the UEs and a scrambling code identifier allocated to the UE, wherein the preset rule includes:
   a rule indicating that a quantity of DMRS ports corresponding to a previously allocated scrambling code by the base station is greater than or equal to a quantity of DMRS ports corresponding to a subsequently allocated scrambling code by the base station, or
   a rule indicating that a quantity of DMRS ports corresponding to a subsequently allocated scrambling code by the base station is greater than or equal to a quantity of DMRS ports corresponding to a previously allocated scrambling code by the base station.

10. The base station according to claim 9, wherein the overview information comprises at least one of the following information: a total quantity of transport layers of all the UEs, a total quantity of DMRS ports occupied by all the UEs, and a total quantity of DMRS ports not occupied by all the UEs.

11. The base station according to claim 9, wherein the indication information further comprises first information for determining DMRS port configuration information of the UE, and wherein the first information comprises: a maximum DMRS port number allocated to the UE and a quantity of transport layers of the UE, or a minimum DMRS port number allocated to the UE and a quantity of transport layers of the UE.

12. The base station according to claim 10, wherein:
   the DMRS ports of all the UEs are classified into at least two DMRS port groups;

quasi co-locations (QCLs) of DMRS ports in different DMRS port groups are different; and the overview information comprises overview information of each DMRS port group comprising at least one of the following information:
  a total quantity of transport layers of all UEs corresponding to the DMRS port group, a total quantity of DMRS ports occupied by all the UEs corresponding to the DMRS port group, and a total quantity of DMRS ports not occupied by all the UEs corresponding to the DMRS port group.

* * * * *